(12) United States Patent
Flynn

(10) Patent No.: US 9,345,199 B2
(45) Date of Patent: May 24, 2016

(54) LANDSCAPE EDGER WITH ADJUSTABLE CONNECTION MECHANISM

(75) Inventor: Reilly James Flynn, Ontario, CA (US)

(73) Assignee: Oldcastle Precast, Inc., Auburn, WA (US)

( * ) Notice: Subject to any disclaimer, the term of this patent is extended or adjusted under 35 U.S.C. 154(b) by 784 days.

(21) Appl. No.: 12/695,865

(22) Filed: Jan. 28, 2010

(65) Prior Publication Data

US 2010/0186293 A1 Jul. 29, 2010

Related U.S. Application Data

(63) Continuation-in-part of application No. 29/350,744, filed on Nov. 23, 2009, now Pat. No. Des. 617,012, and a continuation-in-part of application No. 29/344,966, filed on Oct. 7, 2009, now Pat. No. Des. 615,673.

(60) Provisional application No. 61/147,987, filed on Jan. 28, 2009.

(51) Int. Cl.
*A01G 1/08* (2006.01)

(52) U.S. Cl.
CPC ........................................ *A01G 1/08* (2013.01)

(58) Field of Classification Search
CPC ........................................................ A01G 1/08
USPC ..................... 47/32, 32.7, 33; 52/102; 256/19
See application file for complete search history.

(56) References Cited

U.S. PATENT DOCUMENTS

| 3,916,563 | A | | 11/1975 | Tedesh |
| 4,286,808 | A | | 9/1981 | Fouss et al. |
| 4,761,923 | A | | 9/1988 | Reum et al. |
| 4,831,776 | A | * | 5/1989 | Fritch ............................. 47/33 |
| 4,846,437 | A | | 7/1989 | Fitzgerald |
| 4,863,307 | A | | 9/1989 | Jones |
| 4,897,973 | A | | 2/1990 | Foster, Jr. et al. |
| 4,969,289 | A | | 11/1990 | Trifiletti |
| RE33,550 | E | | 3/1991 | Jones |
| 5,073,061 | A | | 12/1991 | Jones |
| 5,092,076 | A | | 3/1992 | Terreta |
| D329,709 | S | * | 9/1992 | Strobl, Jr. ..................... D25/164 |
| 5,168,678 | A | | 12/1992 | Scott, Jr. et al. |
| 5,212,917 | A | | 5/1993 | Kurtz et al. |

(Continued)

FOREIGN PATENT DOCUMENTS

| GB | 002296644 | A | * | 7/1996 |
| GB | 002374269 | A | * | 10/2002 |
| JP | 409059910 | A | * | 3/1997 |

OTHER PUBLICATIONS

Notice of Allowance associated with related U.S. Appl. No. 29/350,744, Jan. 29, 2010, 6 pages.

(Continued)

*Primary Examiner* — David Parsley
*Assistant Examiner* — Thien Thanh Pham
(74) *Attorney, Agent, or Firm* — Sheridan Ross P.C.

(57) ABSTRACT

An edger is provided that includes a cylindrically shaped attachment member that includes at least one tooth for interlocking relationship with another attachment member. The interlocking relationship prevents relative motion between the attached edgers. The edger further comprises a plurality of arcuate members that help support the wall against the restrained pavers and which provide stiffness to the wall.

9 Claims, 35 Drawing Sheets

(56) References Cited

U.S. PATENT DOCUMENTS

| | | | |
|---|---|---|---|
| 5,240,343 A * | 8/1993 | Strobl, Jr. | 404/7 |
| D339,199 S | 9/1993 | Rynberk | |
| 5,259,154 A | 11/1993 | Lilley | |
| 5,301,461 A | 4/1994 | Zwier | |
| 5,375,941 A | 12/1994 | Strobl, Jr. | |
| 5,421,118 A * | 6/1995 | Bauer | 47/33 |
| D378,857 S | 4/1997 | Hale | |
| 5,640,801 A | 6/1997 | Rynbeck | |
| 5,720,128 A | 2/1998 | Smith et al. | |
| 5,729,937 A | 3/1998 | Mantelli | |
| 5,769,562 A | 6/1998 | Jones | |
| 5,771,631 A | 6/1998 | Dawson | |
| 5,806,249 A | 9/1998 | Holms | |
| 6,030,144 A | 2/2000 | Cannella | |
| D424,714 S | 5/2000 | Hale | |
| D427,333 S | 6/2000 | Anderson et al. | |
| 6,071,038 A * | 6/2000 | Strobl, Jr. | 404/7 |
| 6,071,044 A | 6/2000 | Ricciardelli et al. | |
| 6,085,458 A * | 7/2000 | Gau | 47/33 |
| D433,291 S * | 11/2000 | Shamoon | D8/1 |
| 6,202,367 B1 * | 3/2001 | Marino et al. | 52/102 |
| 6,324,783 B1 | 12/2001 | McIntyre et al. | |
| D453,578 S | 2/2002 | Olson | |
| 6,379,078 B1 | 4/2002 | Zwier | |
| 6,409,421 B1 | 6/2002 | Jones | |
| 6,591,547 B1 | 7/2003 | Staten et al. | |
| 6,604,319 B2 | 8/2003 | Whitson | |
| 6,767,159 B2 | 7/2004 | Jones | |
| 6,779,297 B2 * | 8/2004 | Conde | 47/33 |
| 6,938,369 B2 | 9/2005 | Zwier | |
| 6,944,998 B1 * | 9/2005 | King | 52/314 |
| D516,228 S | 2/2006 | Dunbar | |
| 7,152,366 B2 | 12/2006 | Zwier | |
| D541,952 S | 5/2007 | Keeley et al. | |
| D543,286 S | 5/2007 | Keeley et al. | |
| D548,368 S | 8/2007 | Hale et al. | |
| 7,322,714 B2 | 1/2008 | Barnett et al. | |
| D571,937 S | 6/2008 | Shaw | |
| D615,673 S | 5/2010 | Flynn | |
| D617,012 S | 6/2010 | Flynn | |
| 7,774,993 B2 * | 8/2010 | Strobl et al. | 52/102 |
| 2002/0095862 A1 | 7/2002 | Conde | |
| 2002/0112415 A1 | 8/2002 | Eakin | |
| 2008/0104896 A1 | 5/2008 | Strobl et al. | |
| 2009/0013597 A1 * | 1/2009 | Orton | 47/33 |
| 2009/0038238 A1 * | 2/2009 | Kurtz et al. | 52/102 |
| 2009/0165372 A1 * | 7/2009 | Smart | A01G 1/08 47/33 |
| 2010/0186292 A1 * | 7/2010 | Hall | A01G 1/08 47/33 |

OTHER PUBLICATIONS

Official Action for Canada Patent Application No. 2,727,884, dated Apr. 4, 2012 3 pages.

Notice of Allowance for related U.S. Appl. No. 29/344,966, mailed Feb. 18, 2010.

* cited by examiner

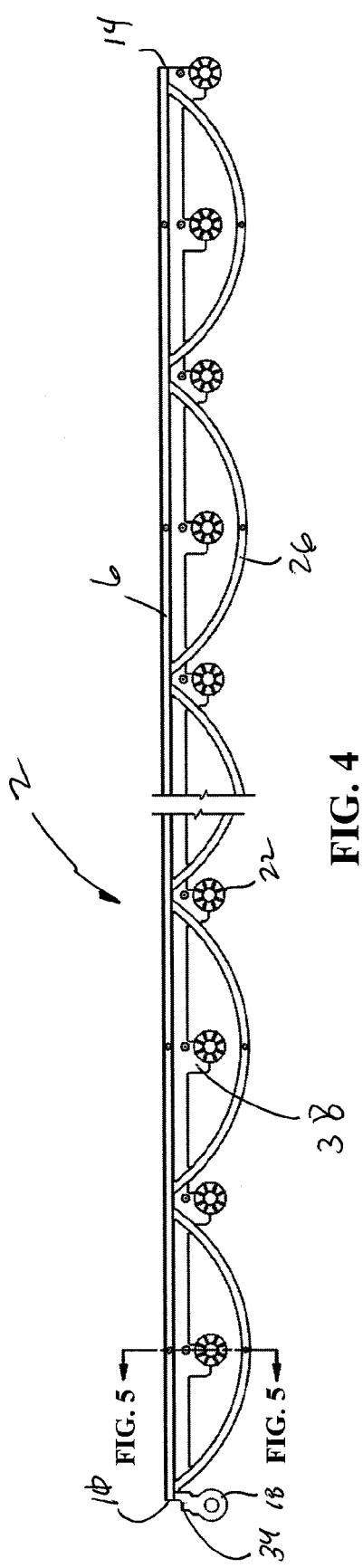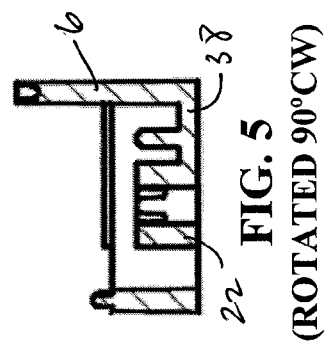

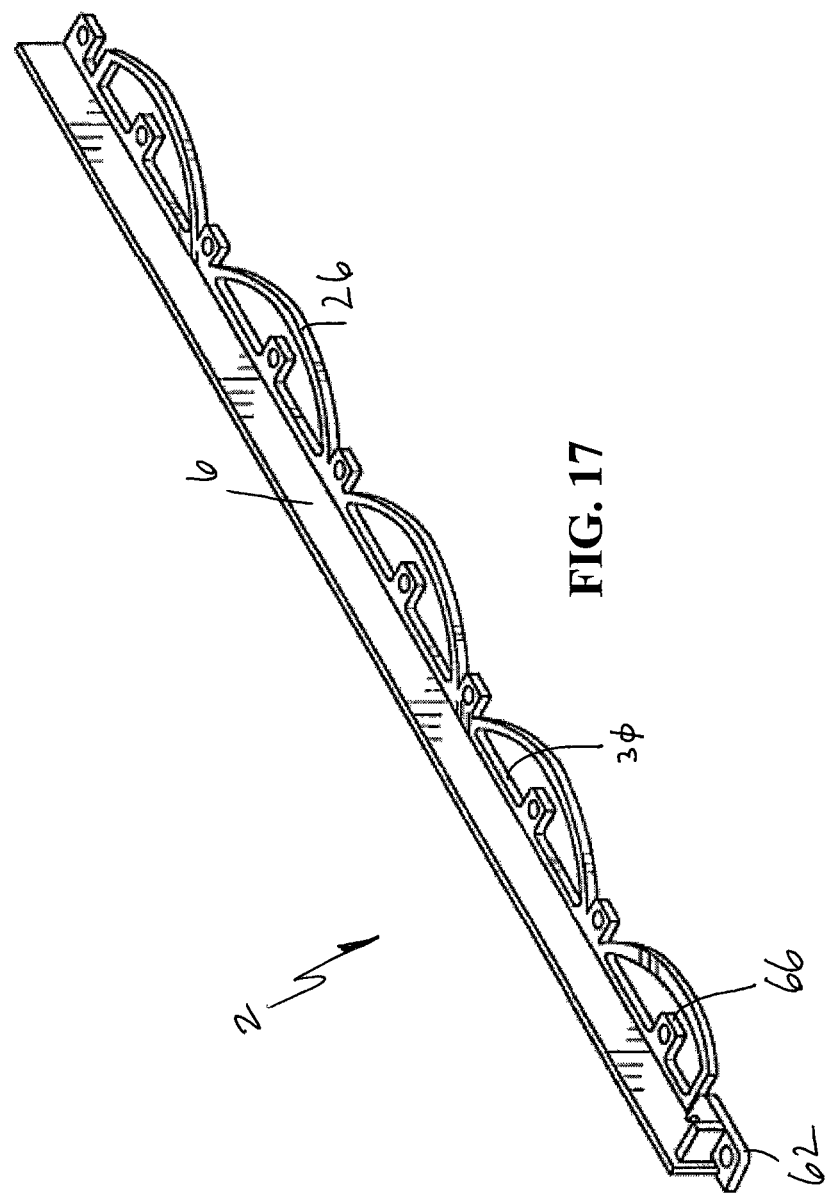

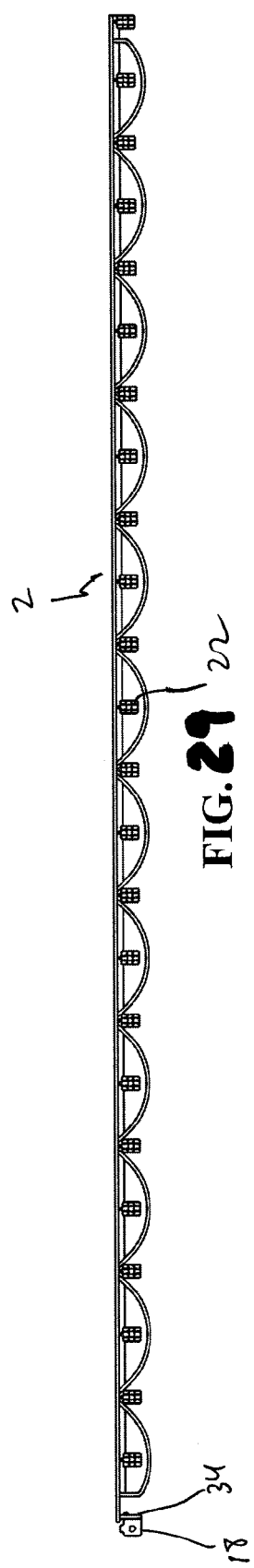
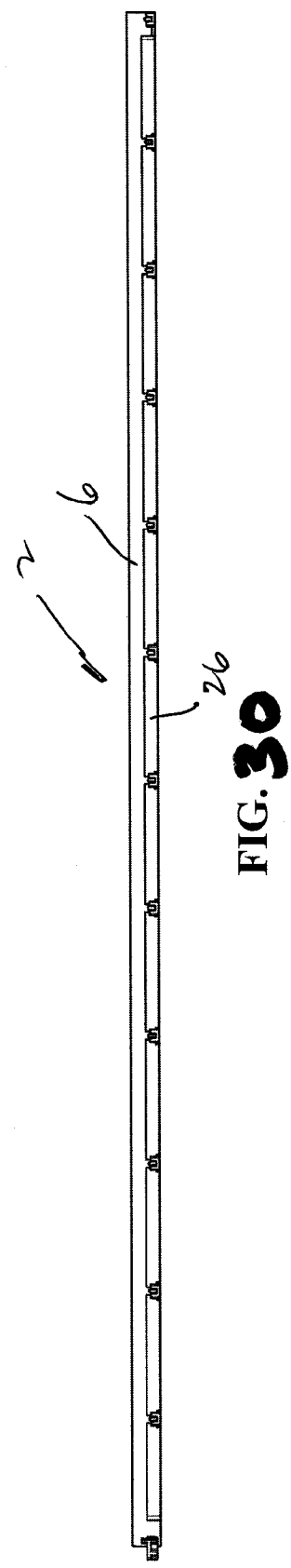
FIG. 29
FIG. 30

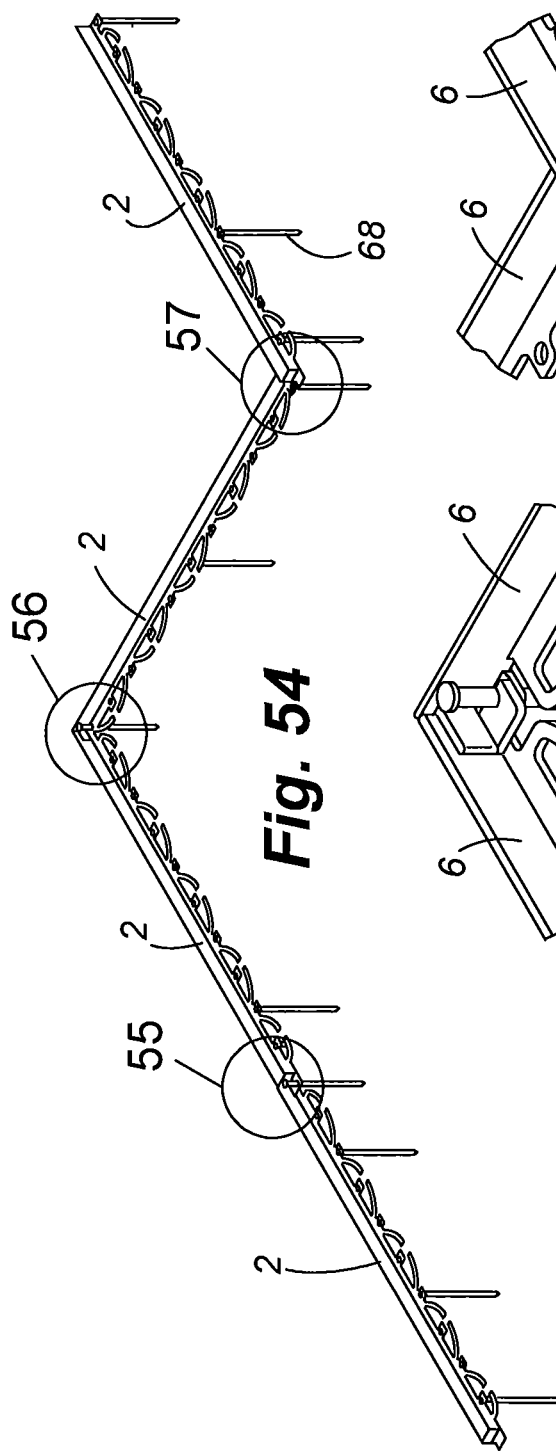
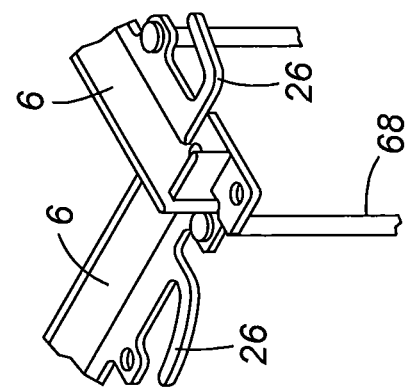
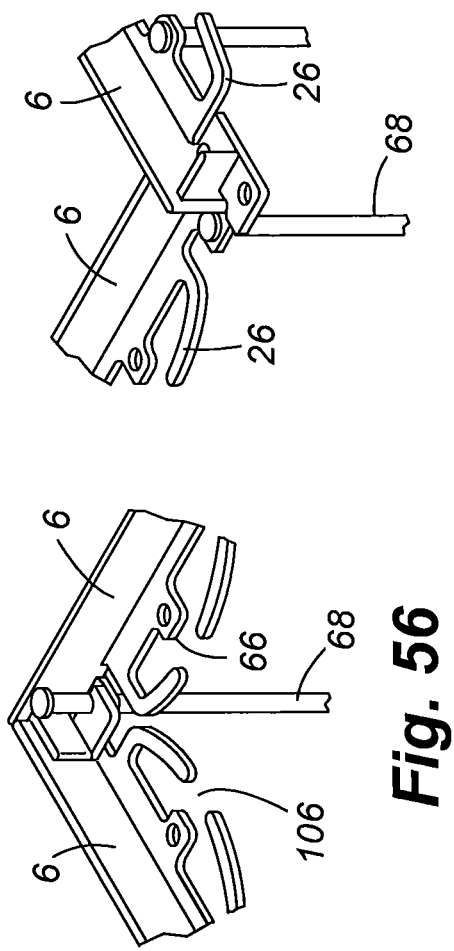
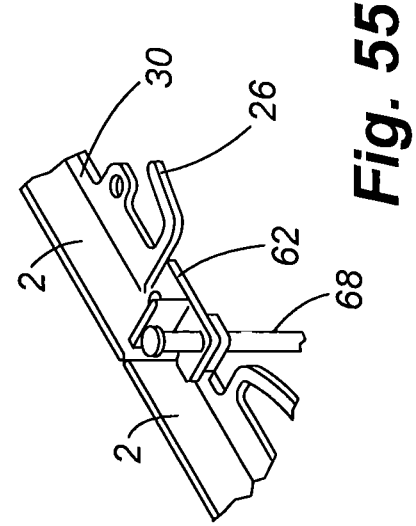

LANDSCAPE EDGER WITH ADJUSTABLE CONNECTION MECHANISM

This application claims the benefit of U.S. Provisional Patent Application Ser. No. 61/147,987, filed Jan. 28, 2009, is a Continuation-In-Part of U.S. patent application Ser. No. 29/350,744, filed Nov. 23, 2009, and a Continuation-In-Part of U.S. patent application Ser. No. 29/344,966, filed Oct. 7, 2009, the entire disclosures of which are incorporated by reference herein.

FIELD OF THE INVENTION

Embodiments of the present invention are generally related to members used to restrain paving stones or other common landscaping materials, and which maintain these materials at a predetermined location and configuration, and define boundaries therebetween.

BACKGROUND OF THE INVENTION

Edging devices (referred to herein as "edgers") are used to define a specific boundary between a grass surface and a landscape surface such as gravel, brick, tile, rock, pavement and paving stones (hereinafter "pavers"). The edger provides a distinct border to prevent the movement or "creep" of the pavers after installation and which compromise the integrity of the landscape surface over time. For example, gaps between adjacent pavers, allows the ingress of water, ice, weeds, etc. that damage, structurally or aesthetically, the landscape surface.

Edgers are often flexible metallic or plastic strips that are installed on or partially under a ground surface to provide a vertical barrier that forms a boundary which constrains the pavers and provides a distinct border between other materials. For example, one simplistic prior art device employs u-shaped clips that straddle a vertical wall and are driven into the ground to hold the edger in place. The prior art edgers are simplistic, yet tend to move over time and can be dangerous to children and pets as they often possess a sharp upper edge.

Other prior art edgers address the stability issue by providing a plurality of footers, belts or other members that extend away from the vertical wall to provide increased rigidity to the vertical wall. Integral apertures or bosses may additionally be incorporated into the edger to receive a spike or nail to secure the edger. One drawback of these more rigid edgers is their increased stiffness, thereby rendering the edger difficult to use to define a non-linear boundary. Examples of various prior art edgers which one or more of these limitations may be found in U.S. Pat. No. 6,767,159, U.S. Pat. No. 6,409,421, U.S. Pat. No. 6,071,038 and U.S. Pat. No. 5,240,343, all of which are incorporated by reference herein.

Further, many prior art edgers do not interconnect securely to form a continuous edging surface, which makes the mate between two adjacent edgers susceptible to movement and detachment. Finally, without a secure method of quickly interconnecting two or more edgers, installation time and subsequent costs are increased, especially in commercial landscaping applications.

SUMMARY OF THE INVENTION

It is thus one aspect of the present invention to provide an edger that is flexible and can be bent to accommodate a paving scheme in a non-linear direction to accommodate any variety of shapes and geometric configurations. More specifically, the edger of one embodiment is sufficiently rigid, but bendable such that it can be formed into a plurality of different shapes and configurations by utilizing a series of continuous or non-continuous arcuate members that extend from a vertical wall (also referred to in the art as a "plate"). In a further aspect of the present invention, the rigidity (i.e., bending stiffness) of the edger can be selectively modified by altering the thickness, height, curvature, and number of the plurality of arcuate members that extend from the vertical wall of the edger. Alternatively, in some embodiments, the bending stiffness of the edger can be modified by decreasing the width of a base member that is associated with a lower edge of the vertical wall.

It is another aspect of the present invention to provide a coupling mechanism that allows two or more edgers to be selectively interconnected and securely maintained. More specifically, in one embodiment, a first coupling device is positioned on one end of the edger. A plurality of complimenting second coupling members are positioned at predetermined locations along the length of the edger for interconnection with the first coupling device to form either a continuous length of edgers. Alternatively, in one embodiment a coupling device is provided which allows two distinct edgers to be interconnected at about a 90° angle.

It is another aspect of the present invention that the length of an edger can be selectively altered to allow adjustments in length, yet allow the interconnection of numerous edgers. In one embodiment, this is accomplished by cutting the edger such that a second connector is located adjacent to a severed edge that mates with the first connector of an adjacent edger.

It is another aspect of the present invention to provide a method of installing a plurality of edgers to define a boundary for a plurality of pavers. Initially, the location of the landscape surface is identified and prepared to receive the plurality of pavers. After the pavers are installed with the edgers there-around, spikes are used to secure the edgers to the ground. The edgers can be interconnected to form a straight interconnection or a 90 degree interconnection. Again, embodiments of the invention are bendable to accommodate a paver configuration with a non-linear edge. For example, some of the edgers presented herein are manufactured in about 8 foot sections that are bent to form an edger with about a 5 foot radius of curvature. Other edgers described below are used primarily for landscape applications, i.e., defining a boundary around a tree, that possess split arcuate members. The landscaping edgers may be manufactured in about 40 inch segments that are interconnectable to form a 10 foot edger that is bendable to form a circle with about a 2 foot radius. It follows that a series of five or ten edgers are bendable to form circles having about 4 or 9 foot radii, respectively.

It is another aspect of embodiments of the present invention to provide an edger for retaining landscaping materials in a predetermined configuration, comprising: an elongated plate having a first end and a second end, said elongated plate comprising an outer surface adapted for contacting the landscaping materials and an inner surface on an opposing side; a footer interconnected to said inner surface of said elongated wall; a plurality of arcuate shaped projections interconnected to at least one of said inner surface of said elongated plate and said footer; a first connector member interconnected, to said first end of said inner surface of said elongated plate and said footer, and a second connector member interconnected to said second end of at least one of said elongated plate and said footer, said first connector and said second connector being adjustable to allow two or more edgers to be aligned in a longitudinal direction or at right angles.

It is yet another aspect of the present invention to provide a landscape edger for retaining landscaping materials in a predetermined configuration, comprising: an elongated plate having a first end and a second end, said elongated plate comprising an outer surface adapted for contacting the landscaping materials and an inner surface on an opposing side; a footer interconnected to said inner surface of said elongated plate; a plurality of arcuate shaped projections interconnected to at least one of said interior surface of said elongated plate and said footer, said arcuate shaped projections allowing said elongated plate to be deflected in a non-linear direction; a first connector attached to at least one of said footer and said substantially vertical wall on said first end, said first connector comprising: a plate with a plurality of apertures; a second connector attached to said at least one of said footer and said substantially vertical wall on a second end, said second connector comprising at least one pin which is adapted to engage said plurality of apertures on said first connector, wherein a first edger can be interconnected to a second edger in a linear direction or alternatively at a 90° angle.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated, in and constitute a part of the specification, illustrate embodiments of the invention and together with the general description of the invention given above and the detailed description of the drawings given below, serve to explain the principles of these inventions.

FIG. 4 is a top plan view of FIG. 1;
FIG. 5 is a cross-sectional view of FIG. 4;
FIG. 17 is a perspective view of another embodiment of the present invention;
FIG. 29 is a top plan view of FIG. 26;
FIG. 30 is a front elevation view of FIG. 26;
FIG. 54 is a perspective view of the embodiment of FIG. 48 shown interconnected to adjacent edgers;
FIG. 55 is a detailed view of FIG. 54;
FIG. 56 is a detailed view of FIG. 54;
FIG. 57 is a detailed view of FIG. 54.

Figure 1:
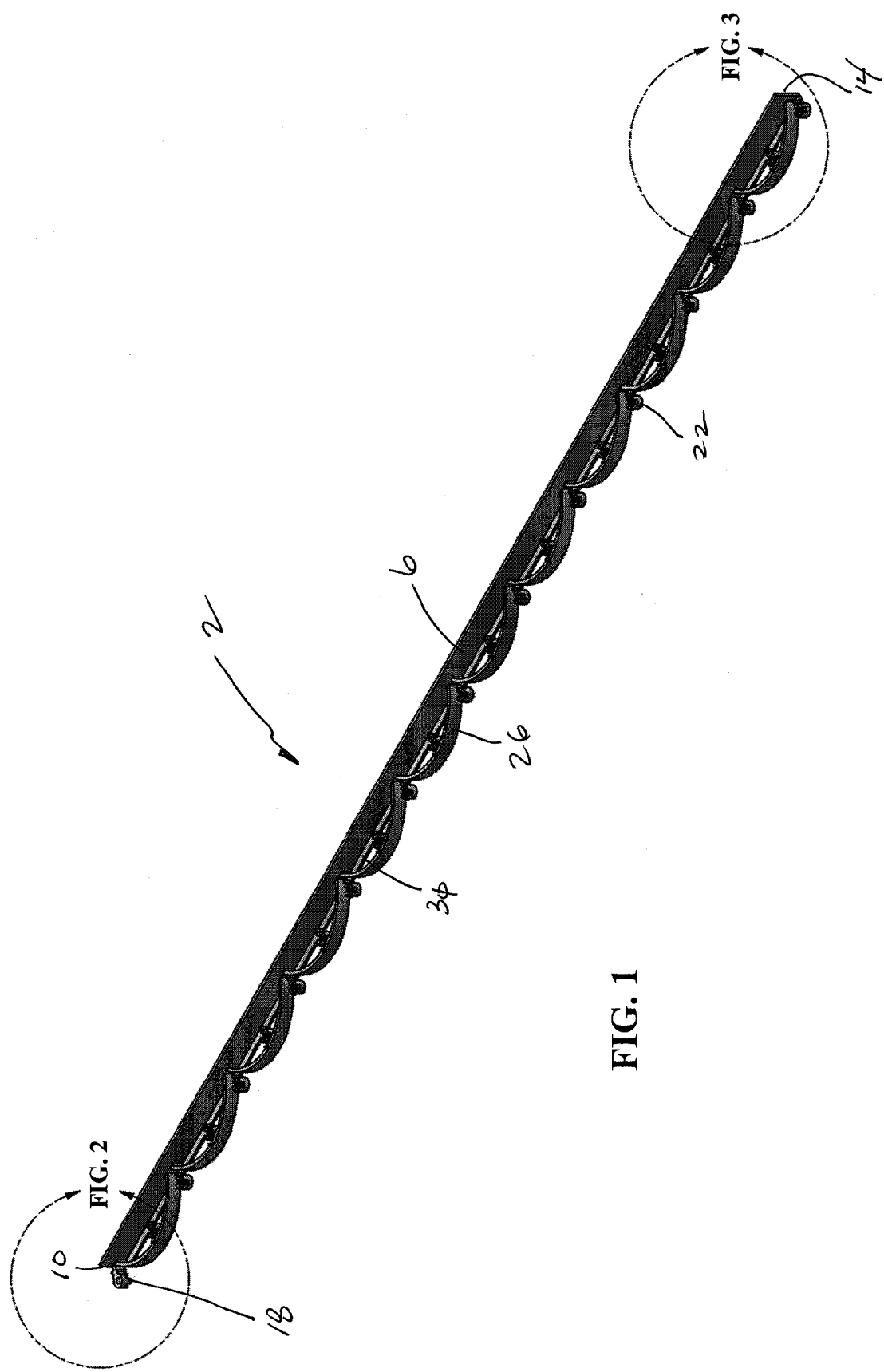
FIG. 1 is a top perspective view of an edger of one embodiment of the present invention.

To assist in the understanding of one embodiment of the present invention the following list of components and associated numbering found in the drawings is provided herein:

| # | Components |
|---|---|
| 2 | Edger |
| 6 | Wall |
| 10 | First end |
| 14 | Second end |
| 18 | Upper attachment member |
| 22 | Lower attachment member |
| 26 | Arcuate members |
| 30 | Footer |
| 34 | Projection |
| 38 | Projection |
| 42 | Tooth |
| 46 | Post |
| 50 | Bore |
| 54 | Recess |
| 58 | Hook |
| 62 | Upper tab |
| 66 | Lower tab |
| 68 | Spike |
| 69 | Frangible portion |
| 70 | Bottom edge |
| 74 | Aperture |
| 78 | Teeth |
| 82 | Hole |
| 86 | Cavity |
| 90 | Clip |
| 94 | Post |
| 98 | Aperture |
| 102 | Spike Aperture |
| 106 | Gap |
| 110 | Spike receiving member |
| 114 | Tooth |
| 118 | Lower bracket |
| 122 | Upper bracket |
| 126 | Aperture |
| 130 | Pin |

It should be understood that the drawings are not necessarily to scale. In certain instances, details that are not necessary for an understanding of the invention or that render other details difficult to perceive may have been omitted. Further, the invention is not necessarily limited to the specific embodiments illustrated herein.

DETAILED DESCRIPTION

Referring now to FIGS. 1-9, an edger 2 of one embodiment of the present invention is shown. More specifically, this embodiment comprises a substantially vertical wall 6 defined by a first end 10 and a second end 14. An upper attachment member 18 is associated with the first end 10 and a lower attachment member 22 is associated with the second end 14. A plurality of lower attachment members 22 are also positioned between the first end 10 and the second end 14. Further, some embodiments of the present invention employ one or more arcuate members 26 that are positioned between the first end 10 and the second end 14 of the edger 2. The wall 6 is adapted to engage a portion of pavers on a first surface, and a footer 30 may also be included that extends from a second surface of the vertical wall 6 that rests on the ground adjacent to the pavers to provide additional stability.

The arcuate members 26 extend from a rear surface of the vertical wall 6, and are provided for additional stability and to prevent movement of the wall 6. That is, one of skill in the art will appreciate that the pavers tend to separate over time, which is exacerbated if the edger is not secure. More specifically, the arcuate members 26 maintain the wall 6 in a vertical orientation and help counteract force associated with the expanding pavers. Further, the arcuate walls have an open interior space which allows grass and other vegetation to grow, thus providing additional stability. Although a plurality of arcuate members 26 are shown, any number of members may be employed. Furthermore, the arcuate members 26 act as a leaf spring that add flexibility while maintaining stiffness to the wall 6 of the edger. Thus the edger 2 of this embodiment of the present invention may be used in a linear fashion or curved. More specifically, the advantage of this embodiment of the present invention is that the footer employed is substantially smaller than the wall 6 wherein the footer 30 is not solely responsible for maintaining the vertical orientation of the wall 6. Thus the wall 6 has a decreased bending stiffness in one direction, thereby allowing it to flex and bend to accommodate non-linear paver arrangements, while maintaining a rigid backing to the pavers. In a preferred embodiment, different sections of arcuate portions and/or edger sections may be provided with varying degrees of stiffness based on thickness, materials, etc. to provide selective flexibility and bendability.

Figure 2:
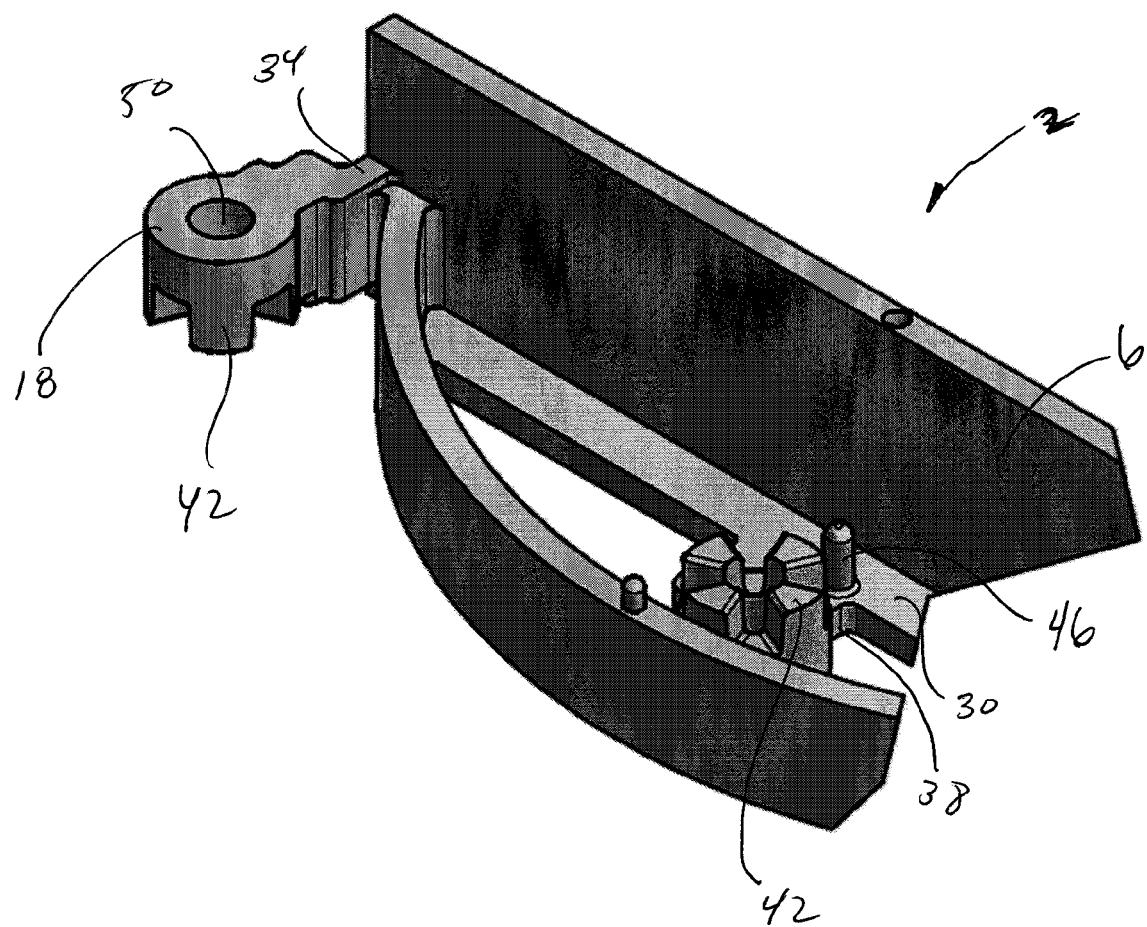
FIG. 2 is a detailed view of FIG. 1.
Figure 3:
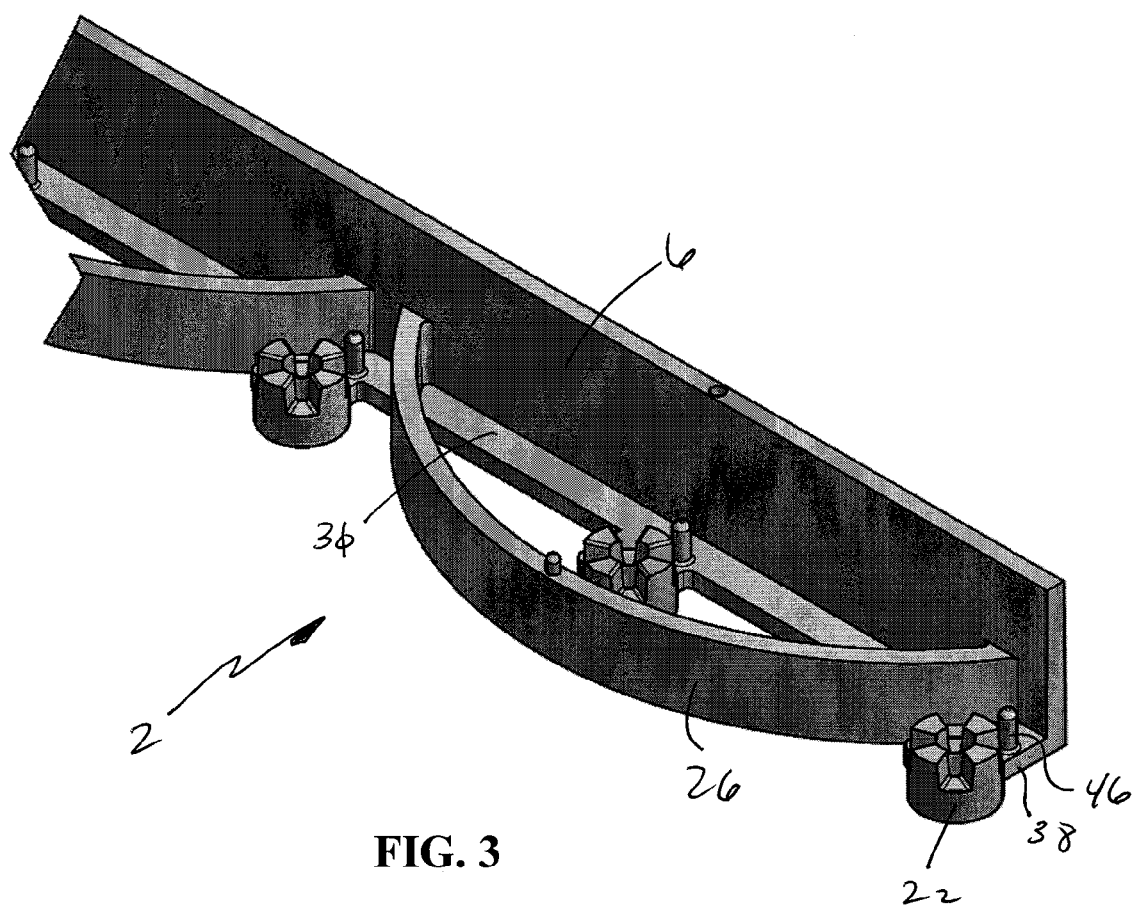
FIG. 3 is a detailed view of FIG. 1.
Figure 6:
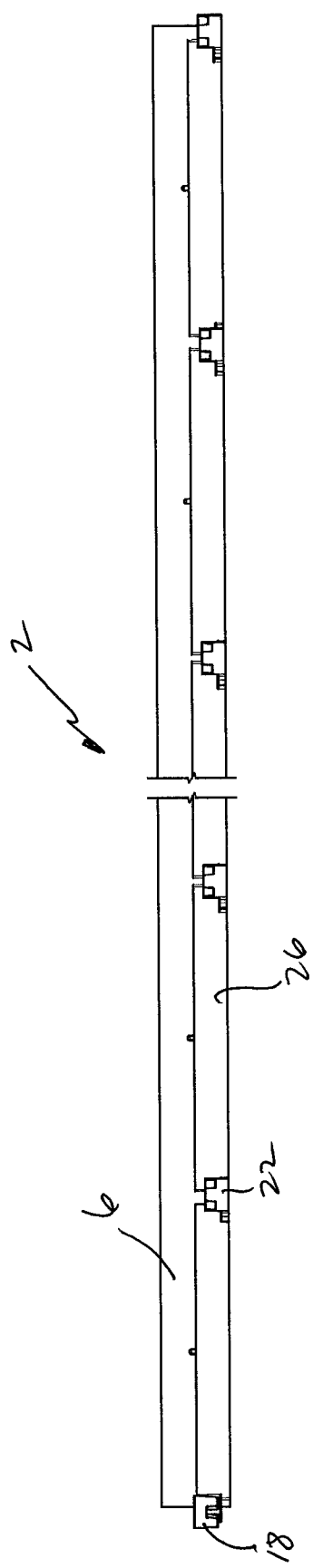
FIG. 6 is a front elevation view of FIG. 1.
Figure 8:
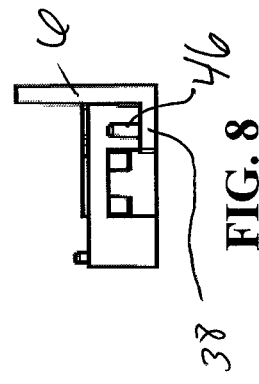
FIG. 8 is a right elevation view of FIG. 1.
Figure 7:
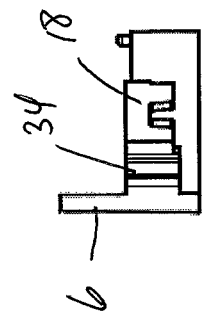
FIG. 7 is a left elevation view of FIG. 1.
Figure 9:
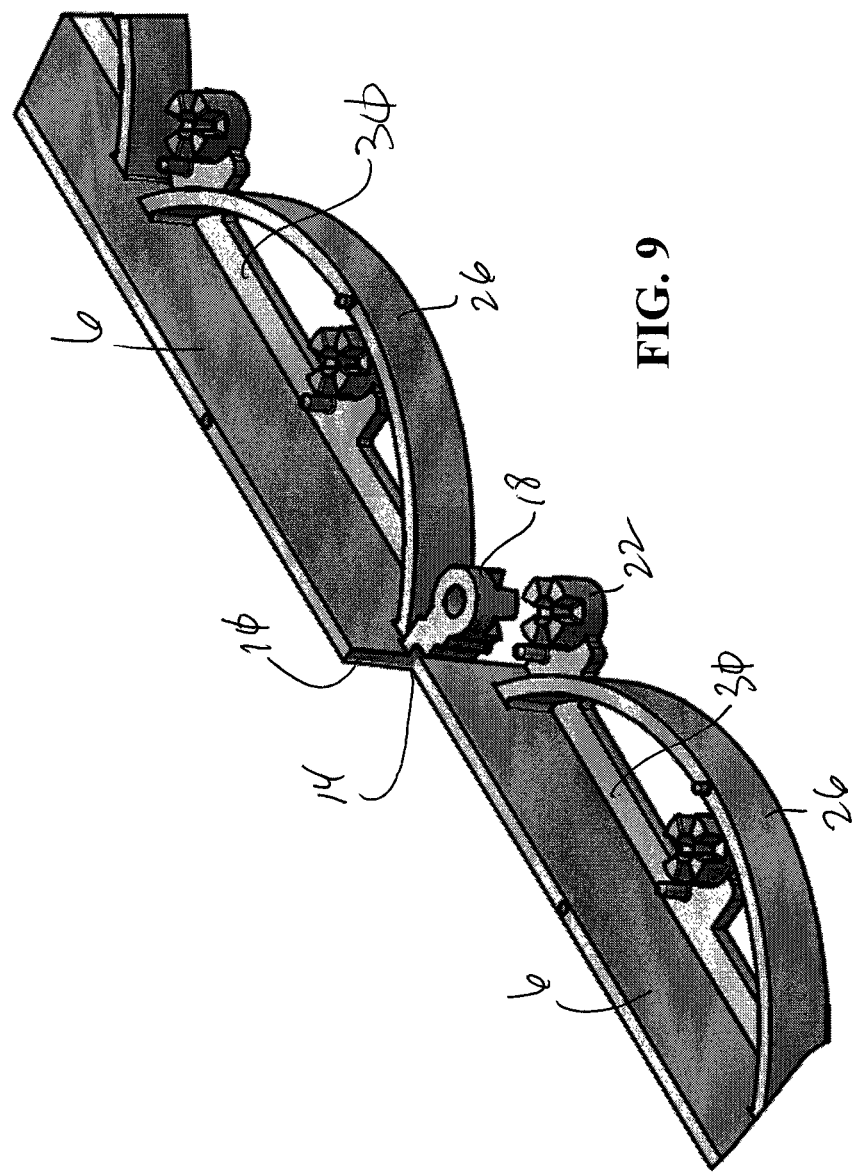
FIG. 9 is a partial perspective view showing the interconnection of adjacent edgers.
Figure 10:
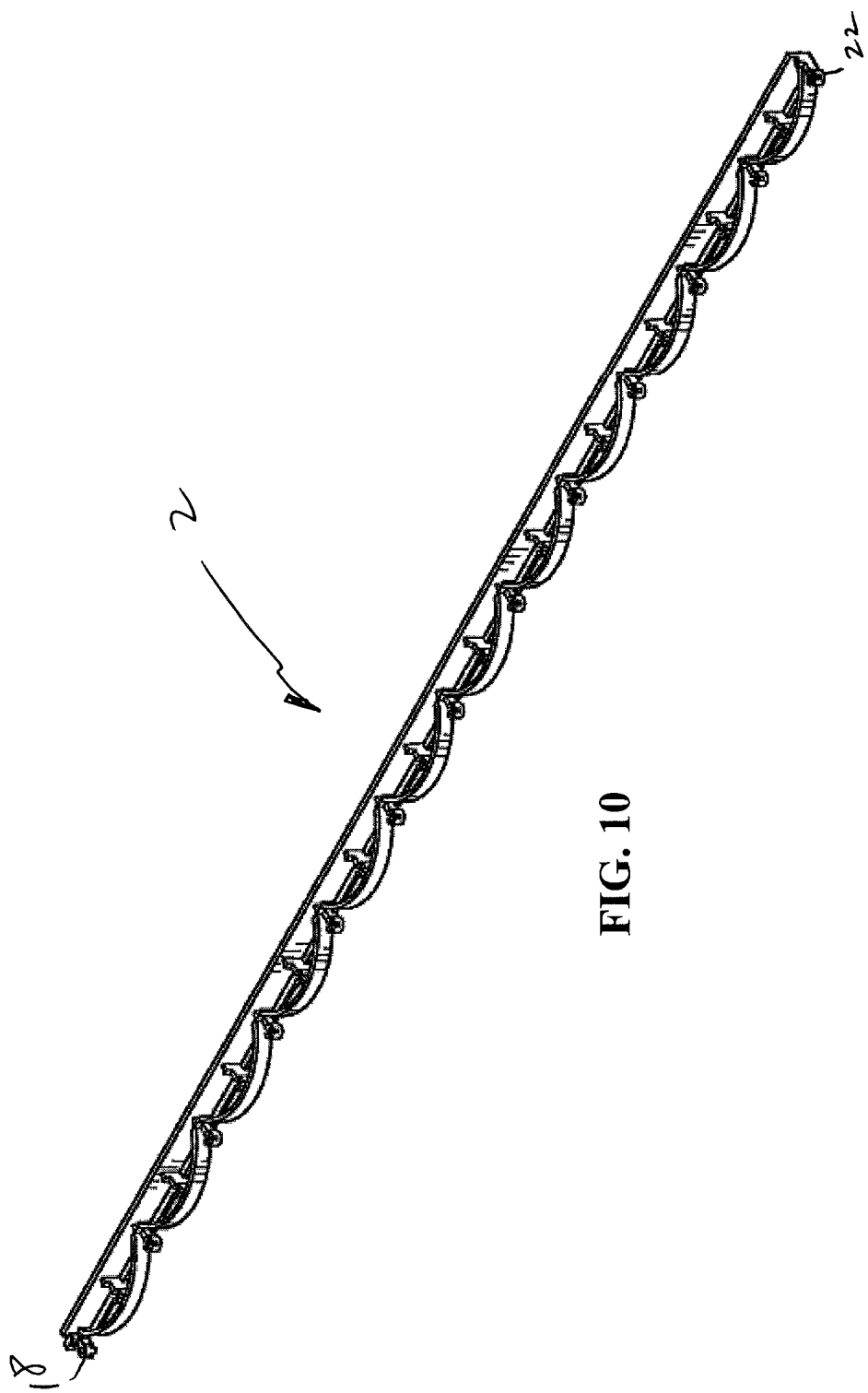
FIG. 10 is a perspective view of another embodiment of the present invention.
Figure 11:
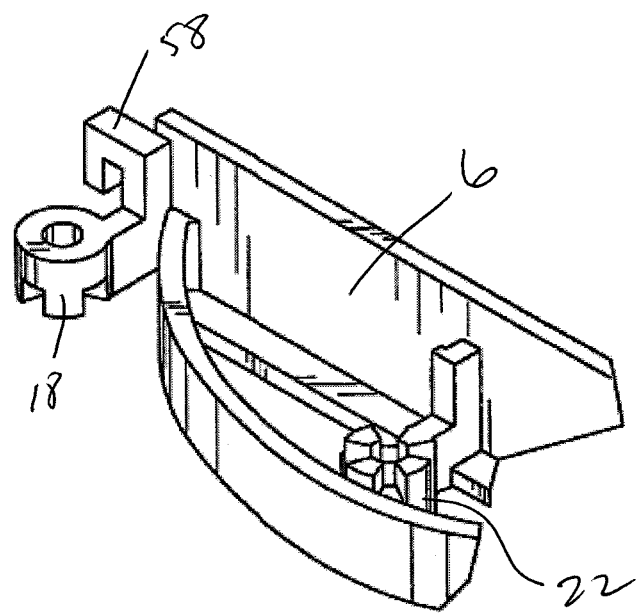
FIG. 11 is a detailed view of FIG. 10.
Figure 12:
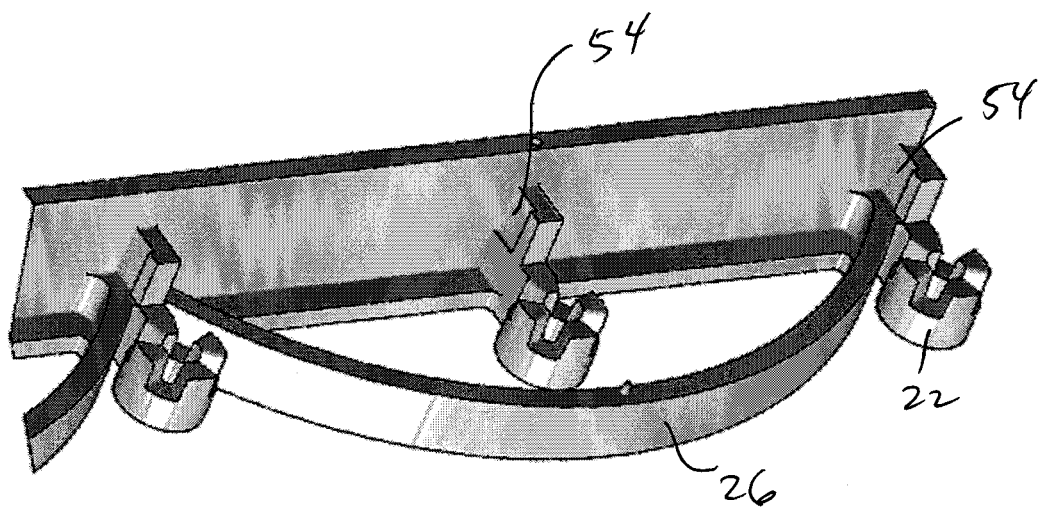
FIG. 12 is a detailed view of FIG. 10.
Figure 13:
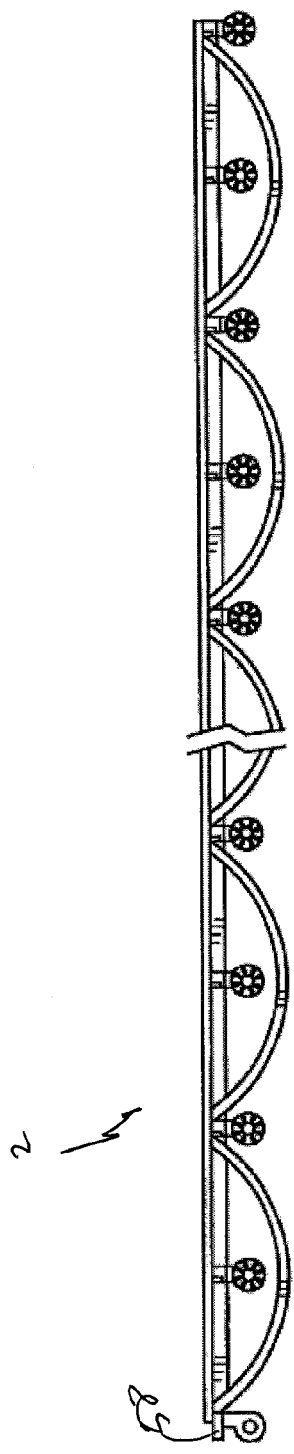
FIG. 13 is a top plan view of FIG. 10.
Figure 14:
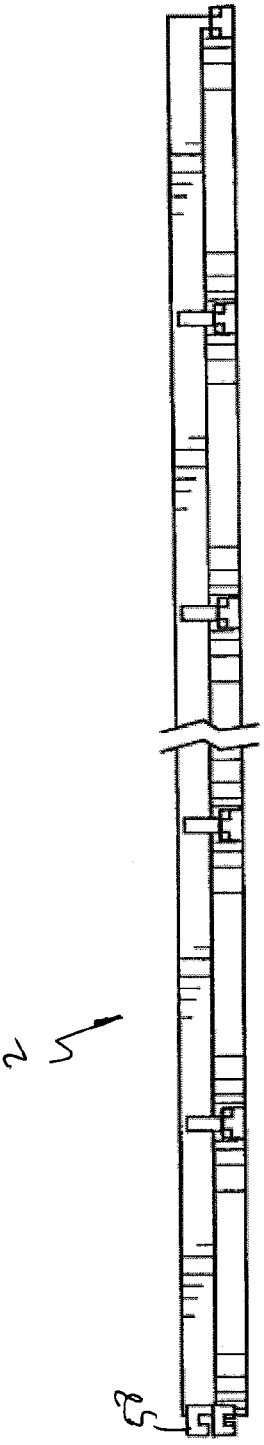
FIG. 14 is a front elevation view of FIG. 10.
Figure 16:
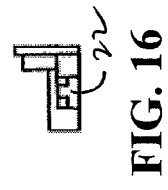
FIG. 16 is a right elevation view of FIG. 10.
Figure 15:
FIG. 15 is a left elevation view of FIG. 10.
Figure 18:
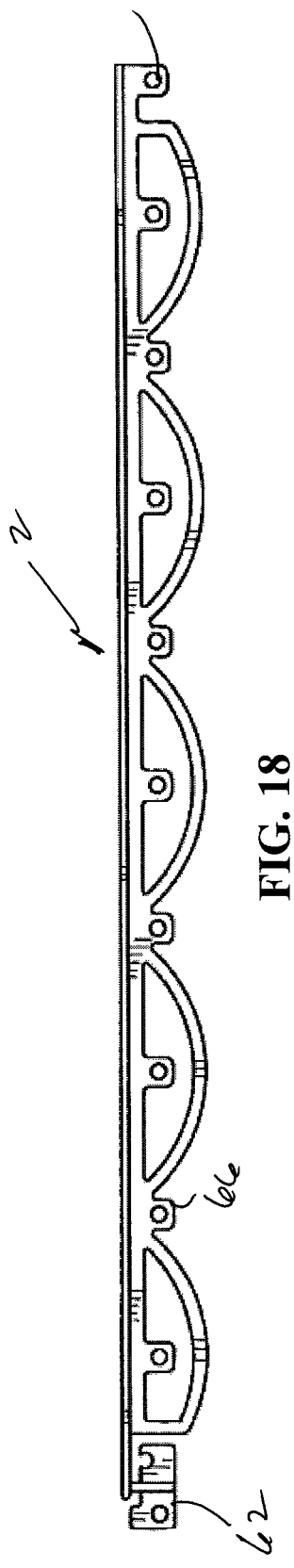
FIG. 18 is a top plan view of FIG. 17
Figure 19:
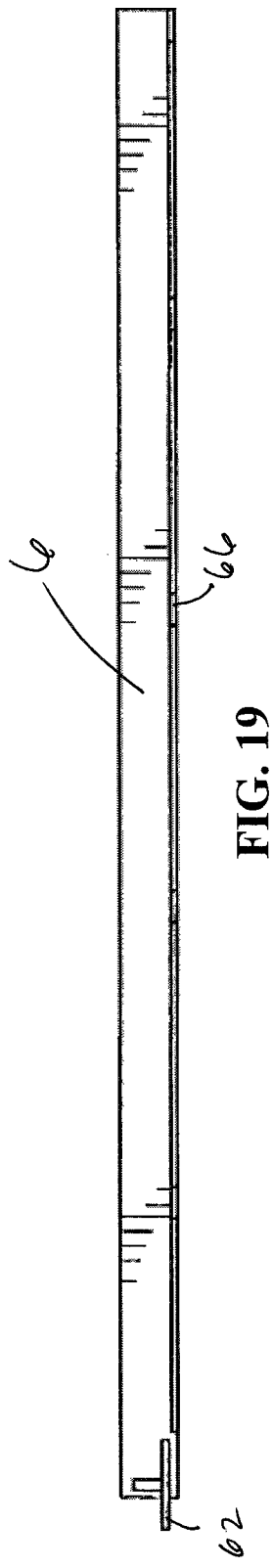
FIG. 19 is a front elevation view of FIG. 17.
Figure 21:
FIG. 21 is a right elevation view of FIG. 17.
Figure 20:
FIG. 20 is a left elevation view of FIG. 17.
Figure 22:
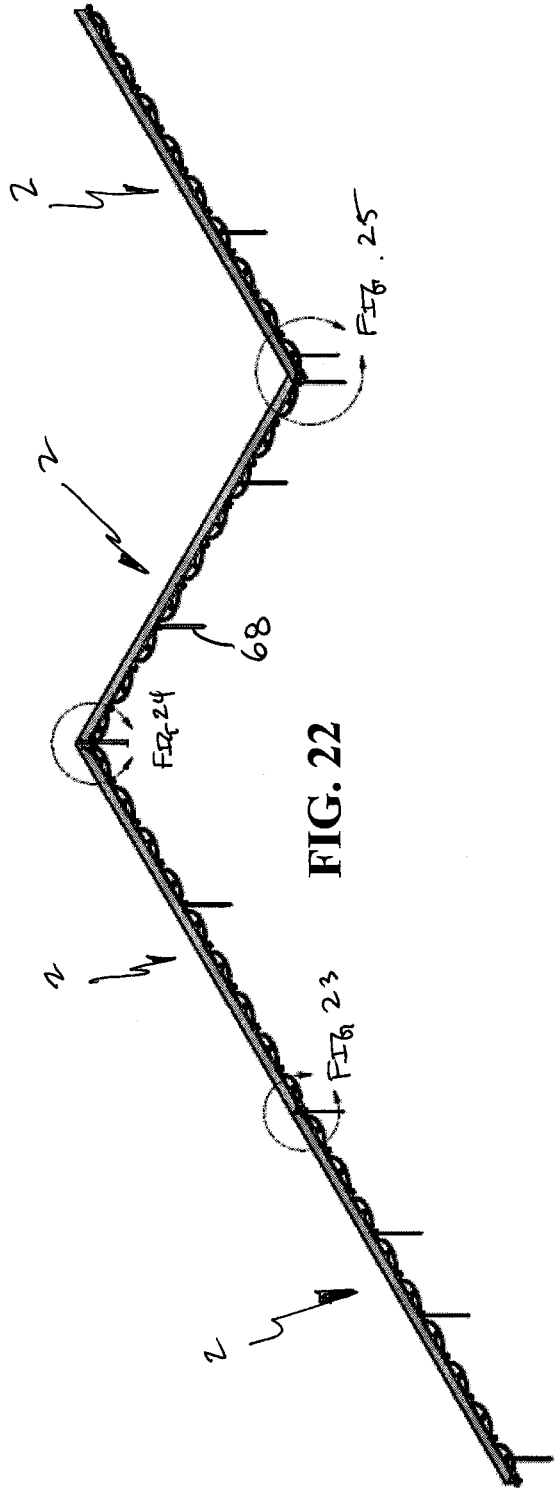
FIG. 22 is a perspective view of the embodiment of FIG. 17 shown interconnected to adjacent edgers.
Figure 25:
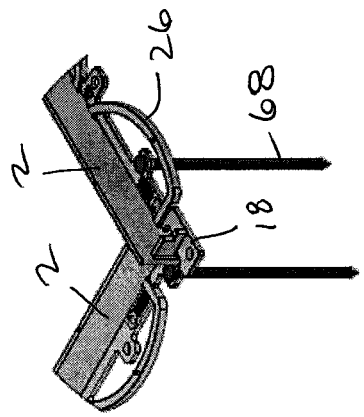
FIG. 25 is a detailed view of FIG. 22.
Figure 24:
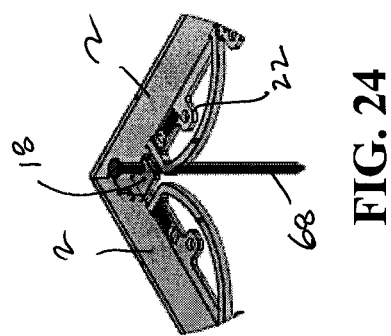
FIG. 24 is a detailed view of FIG. 22.
Figure 23:
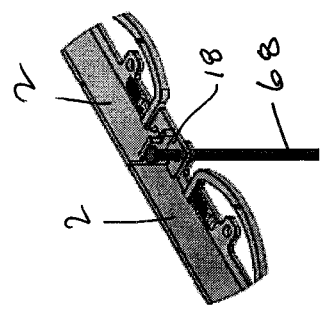
FIG. 23 is a detailed view of FIG. 22.
Figure 26:
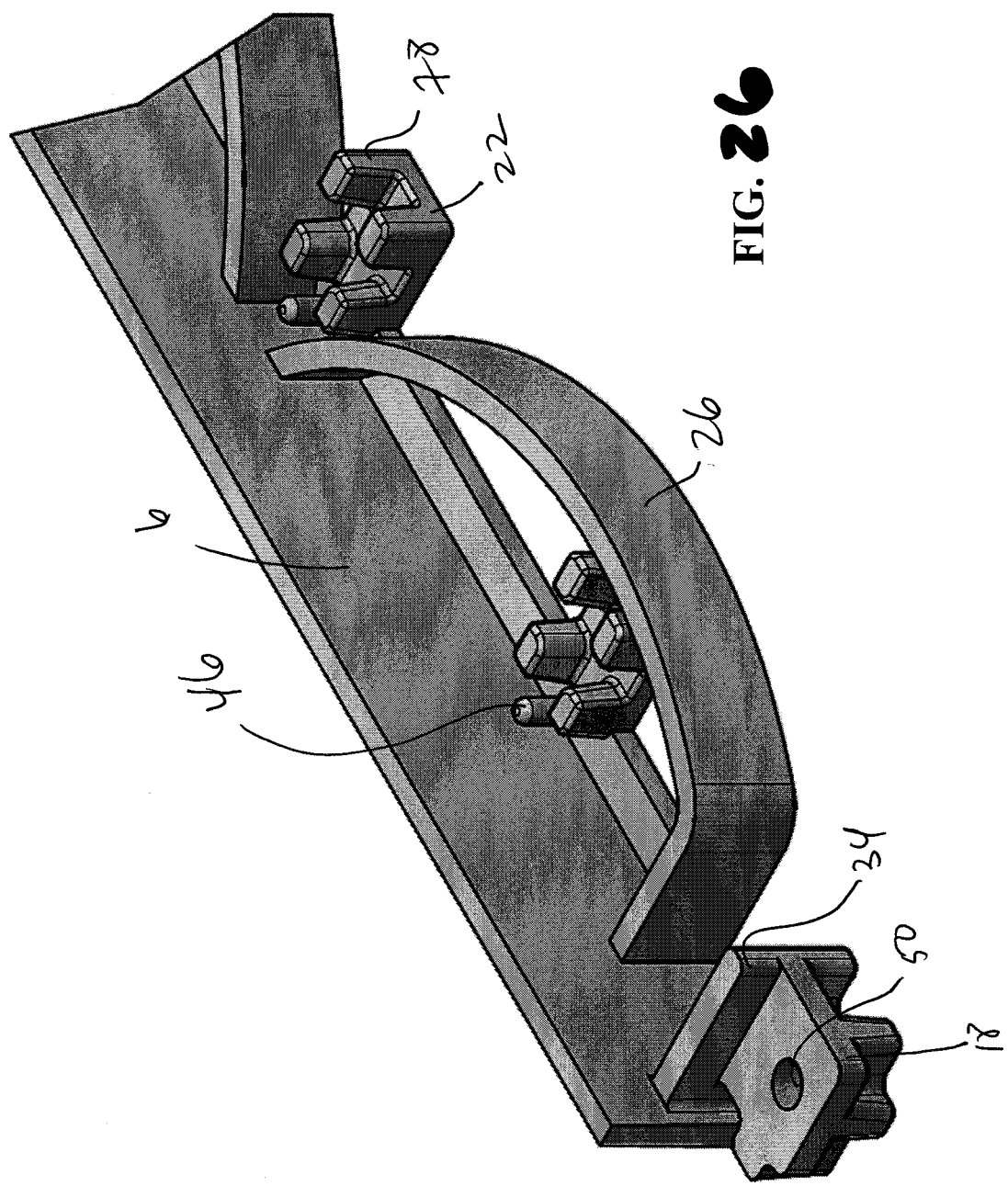
FIG. 26 is a detail top perspective view of a first end of yet another embodiment of the present invention.
Figure 27:
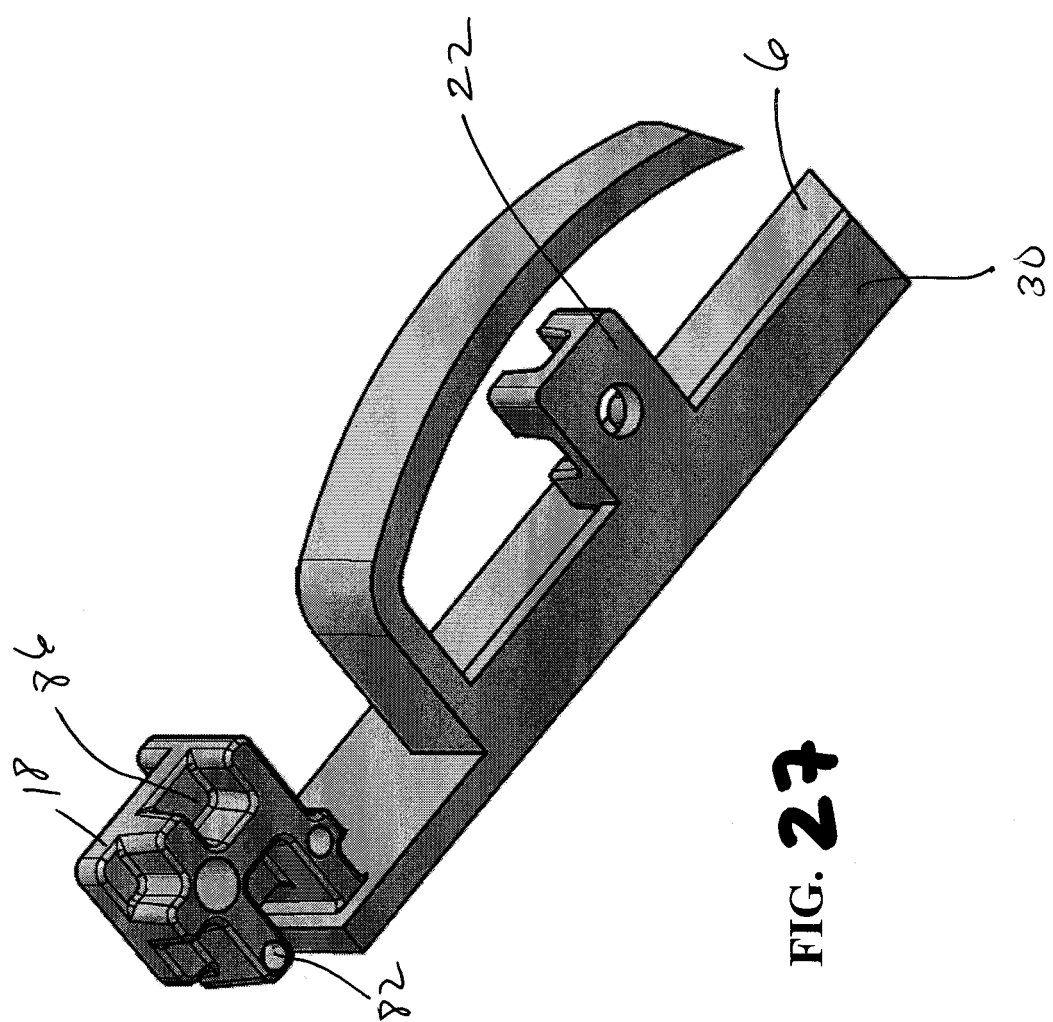
FIG. 27 is a detailed bottom perspective view of FIG. 26.

With reference to FIGS. 2, 3 and 9, the upper attachment member 18 and the lower attachment member 22 are shown in detail. Preferably, the upper attachment members 18 are interconnected to the wall 6 by way of a projection 34. Similarly, the lower attachment member 22 is interconnected to the footer 30 by way of a projection 38. The upper attachment member 18 and the lower attachment member 22 each include at least one tooth 42 that provides an interlocking relationship between the two attachment members. In addition, some embodiments of the present invention include a post 46 that is positioned between the lower attachment member 22 and the wall 6. The post 46 is designed to engage the upper attachment member 18 to prevent relative rotational motion between interconnected edgers 2.

Preferably, the post 46 is inserted into a tapped hole (now shown) positioned in either the upper attachment member 18 or the projection 34 associated therewith. The post 46 and interlocking tooth 42 combination help provide additional support to prevent relative movement between interconnected edgers, and to expedite the time required for installation. One skilled in the art will appreciate, however, that the post 46 may simply abut the projection 34 or upper attachment member 18 and not be designed to be inserted into a hole. One of skill in the art will appreciate that the post 4 may be associated with the upper attachment member 18. Further, the upper attachment member 18 and lower attachment member 22 may each include a countersunk hole that receives the post, i.e., a dowel, to provide further interconnection methods to the installer. Each attachment member may further include a bore 50 in a preferred embodiment for the receipt of a spike that secures the edgers to the ground. In some embodiments only the lower attachment member 22 receives a spike. The material of the edger 2 is such that it can be cut at various locations to alter its length, and may be comprised of various forms of plastic including polyethylene, polyurethane or other materials well known in the art. In one embodiment of the present invention, the edger is about 8 feet long having a height of about 1¾ inches. However, any variation of length and width may be employed depending on the design characteristics or requirements of the installation.

Referring now to FIG. 9, two edgers 2 are shown just prior to interconnection. The upper attachment member 18 is designed to interlock with the lower attachment member 22. At least one tooth 42 on the upper attachment member 18 and at least one tooth 42 on the lower attachment member 22 provides a means for interlocking two edgers. Furthermore, the post 46 may be provided adjacent to the lower attachment member 22 and/or the upper attachment member 18 that is received within the projection 34, 38 associated with either the upper attachment member 18 or the lower attachment member 22. It is important to note that the interlocking teeth are designed to allow adjacent edgers to be interconnected at various angles relative to each other. For example, in the embodiments shown, the edgers may be aligned as shown, or alternatively be interlocked at about a 90 degree angle with respect to each other. Alternative designs may also allow the interconnection of two edgers at angles ranging from 0-150 degrees.

Referring now to FIGS. 10-16, yet another embodiment of the present invention is shown which is similar to that described above with respect to FIGS. 1-9. This embodiment includes a projection 38 having an incorporated recess 54. The recess 54 is designed to receive a hook 58 associated with an upper attachment member 18 to facilitate interlocking between interconnected edgers. Alternatively, the hook 58 and associated recess 54 on the adjacent edger can be stand alone components where no attachment members are provided. Further, the upper attachment member 18 and lower attachment member 22 may each include at least one tooth 42 to provide a means for interconnection. Each attachment member also includes a bore 50 for receiving a spike, for example.

Referring now to FIGS. 17-25 another embodiment of the present invention is depicted that employs an interconnection scheme that does not include a mating engagement. More specifically, this embodiment of the present invention includes an outwardly extending upper tab 62 that is designed to rest over a lower tab 66 that is associated with a bottom edge 70 of the wall 6. The lower tab 66 may in some embodiments extend from the footer 30 of the edger 2. The adjacent edgers are secured by a spike 68. The edger 2 of this embodiment also may include a plurality of arcuate members 26 that are associated with the bottom edge 70 of the wall 6 as well. In operation, the upper tab 62 is placed over the lower tab 66 positioned at the end of the edger 2 and a nail or spike is placed through apertures 74 provided in the upper tab 62 and the lower tab 62.

Figure 28:
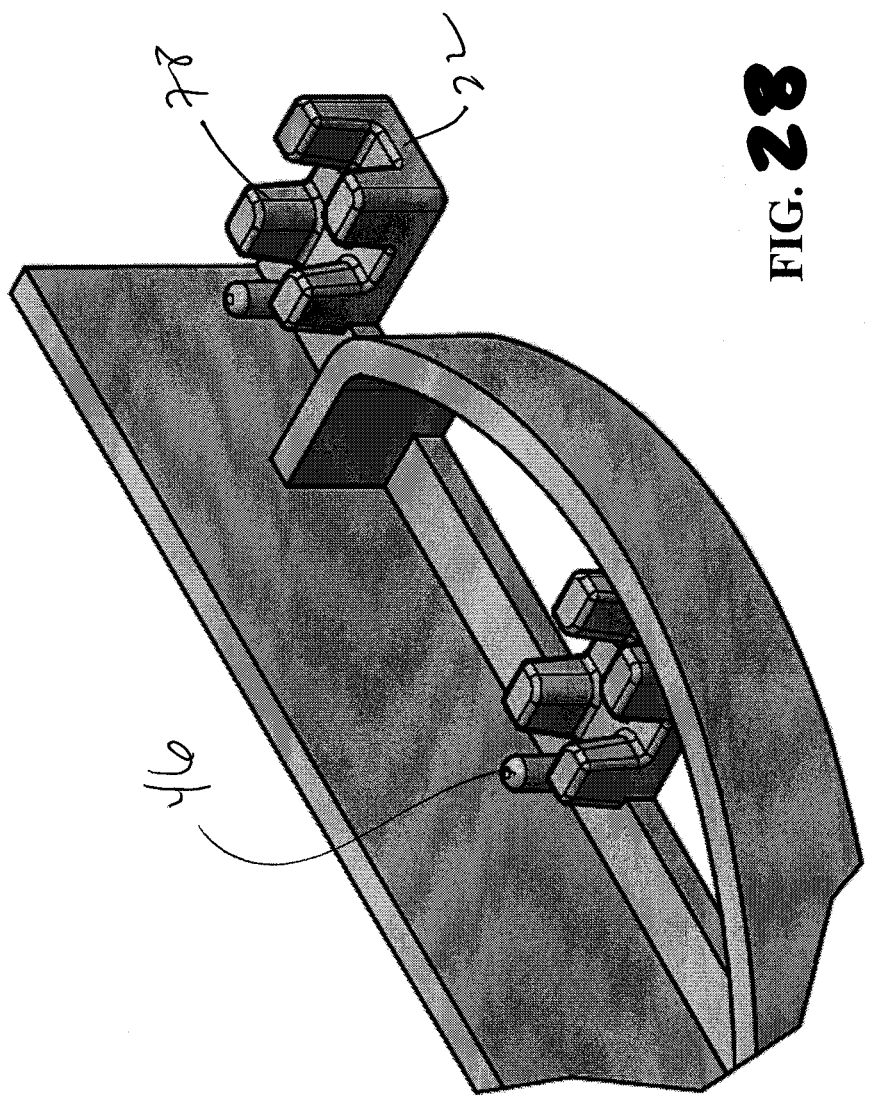
FIG. 28 is a detailed top perspective view of a second end of the edger shown in FIG. 26.
Figure 31:
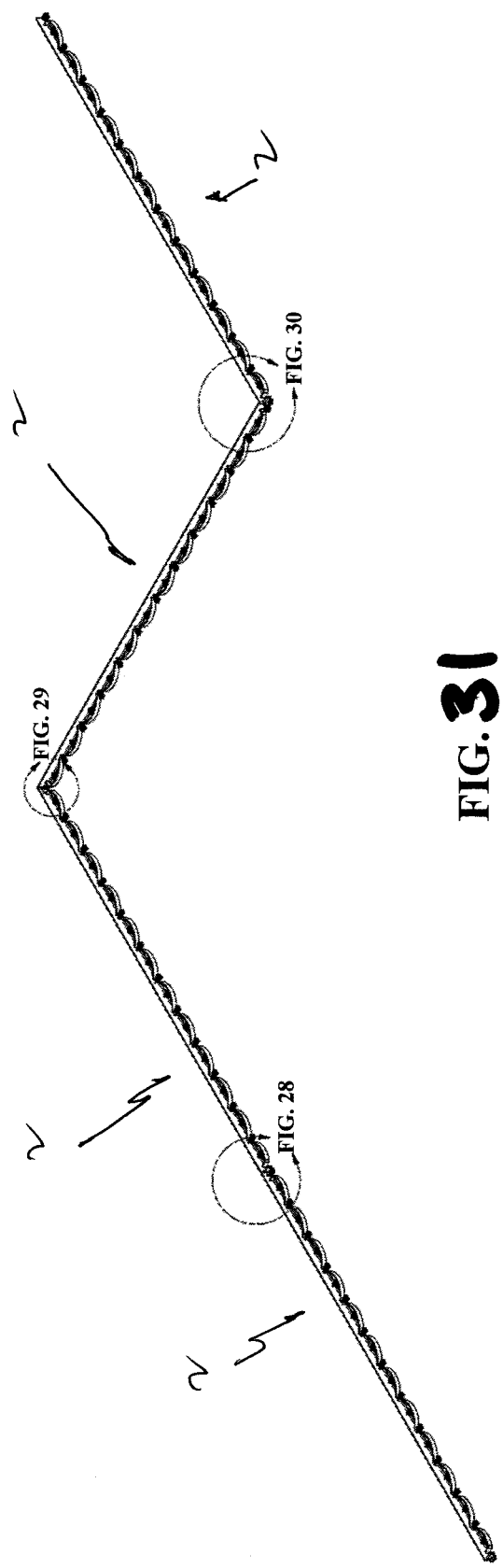
FIG. 31 is a perspective view of the embodiment of FIG. 29 shown interconnected to adjacent edgers.

Referring now to FIGS. 26-34, another embodiment of the invention is provided herein. This embodiment is similar to FIGS. 1-9 wherein an upper attachment member 18 and a lower attached member 22 are interconnected via a series of teeth 78 that fit into cavities positioned in the upper attachment member 18. The upper attachment member 18 of this embodiment of the present invention is situated about 90 degrees from the projection 34 and is designed to be removed from the edger 2 to provide further interconnection schemes, which will be described in further detail below. The post 46 of this embodiment of the present invention is associated with the footer 30 and is designed to engage a tapped hole 82 in the upper attachment member 18 as seen in FIG. 28. The upper attachment member 18 and the lower attachment member 22 each include a bore 50 for the receipt of a spike.

Figure 32:
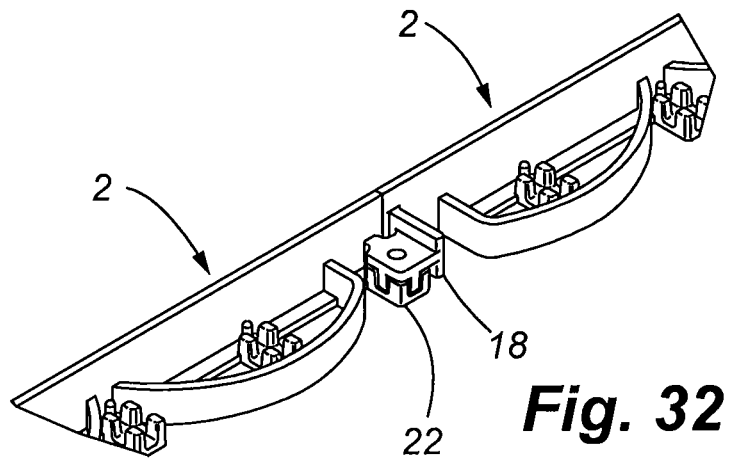
FIG. 32 is a detailed view of FIG. 31.
Figure 33:
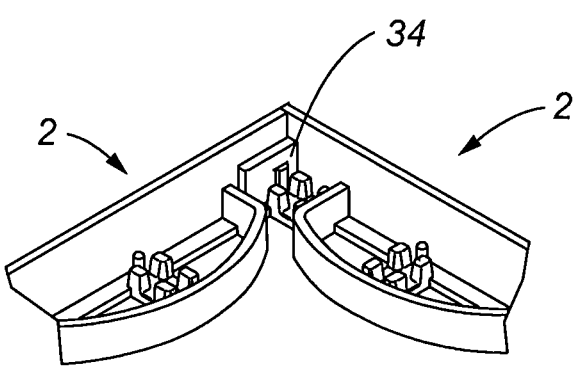
FIG. 33 is a detailed view of FIG. 31.
Figure 34:
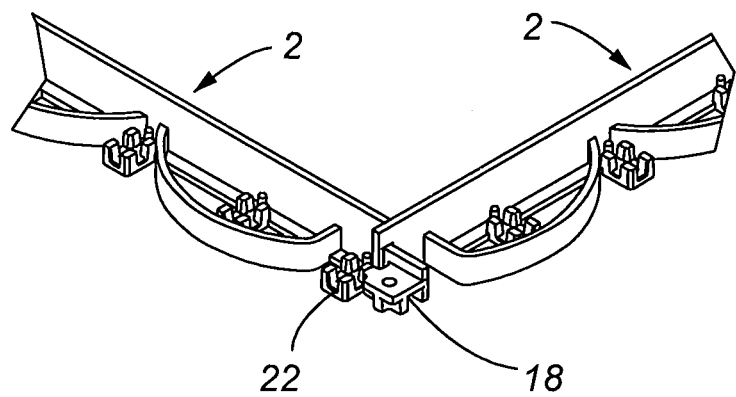
FIG. 34 is a detailed view of FIG. 31.

Referring now specifically to FIGS. 32-34, the interconnection scheme of this embodiment of the present invention is shown. More specifically, FIG. 32 shows an interconnection mechanism where the upper attachment member 18 is locked to the lower attachment member 22, and wherein the post associated with the lower attachment member is inserted into a tapped hole of the upper attachment member. FIG. 33 shows an inner 90 degree corner configuration wherein the upper attachment member 18 has been removed from the projection 34 and the projection 34 abutted against the wall 6 of an adjacent edger. Finally, FIG. 34 shows an outer 90 degree corner configuration wherein adjacent walls 6 are abutted to define a boundary of the pavers. In this embodiment, a spike would be inserted into the bore 50 of the upper attachment member 18 and another spike would be inserted into the bore of the lower attachment member 22 to maintain the orientation shown.

Figure 35:
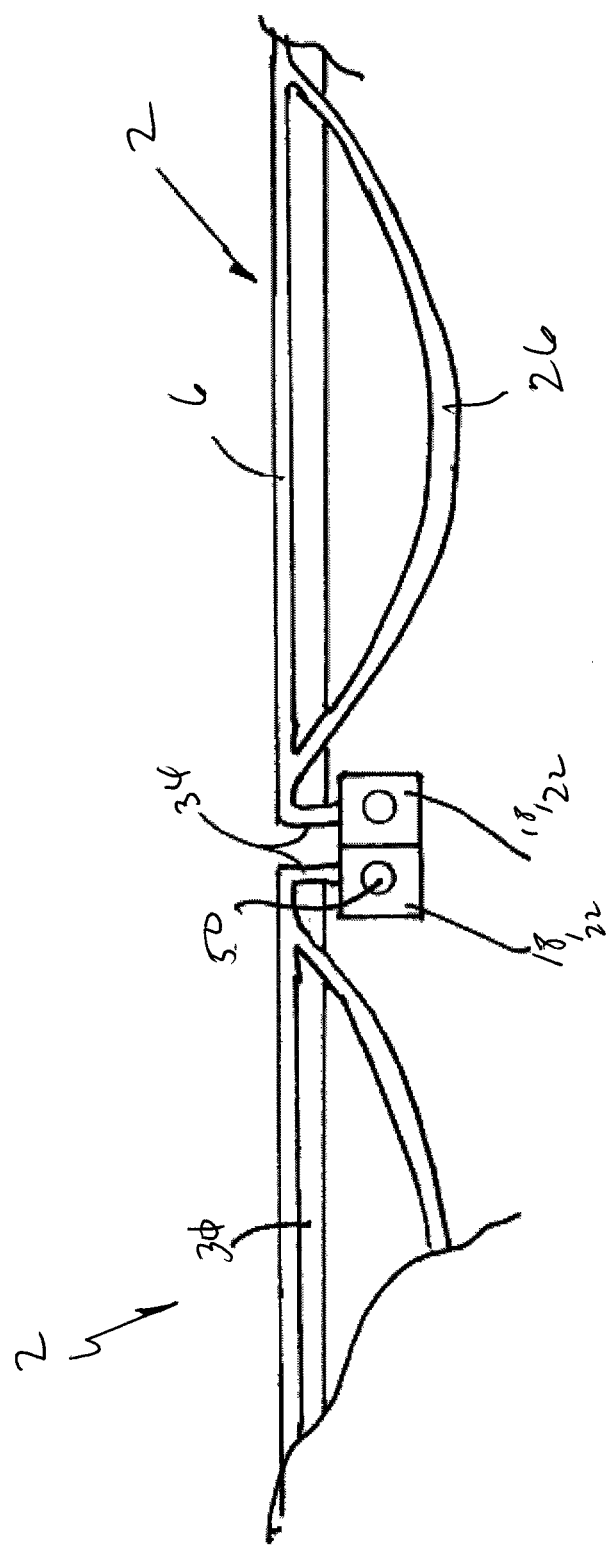
FIG. 35 is a partial detailed view of another embodiment of the present invention similar to the embodiment shown in FIG. 1.

Referring now to FIG. 35, another interconnection scheme is provided herein. More specifically, edgers are provided that include upper 18 or lower attachment members 22 that are designed to abut or be positioned relative thereto. Each attachment member may also include a bore 50 receiving a spike to maintain the respective edgers in place. This system of interconnection is different from those shown and described above wherein the upper 18 and lower attachment members 22 interconnect. In order to maintain the integrity of the vertical wall 6, one skilled in the art will appreciate that at least one of the walls may extend past the protrusion to engage each other. Interlocking mechanisms may also be included on the wall or associated with the protrusion to help maintain interconnection of adjacent edgers. Such interconnection members may also be used during installation to help align adjacent edgers.

Figure 36:
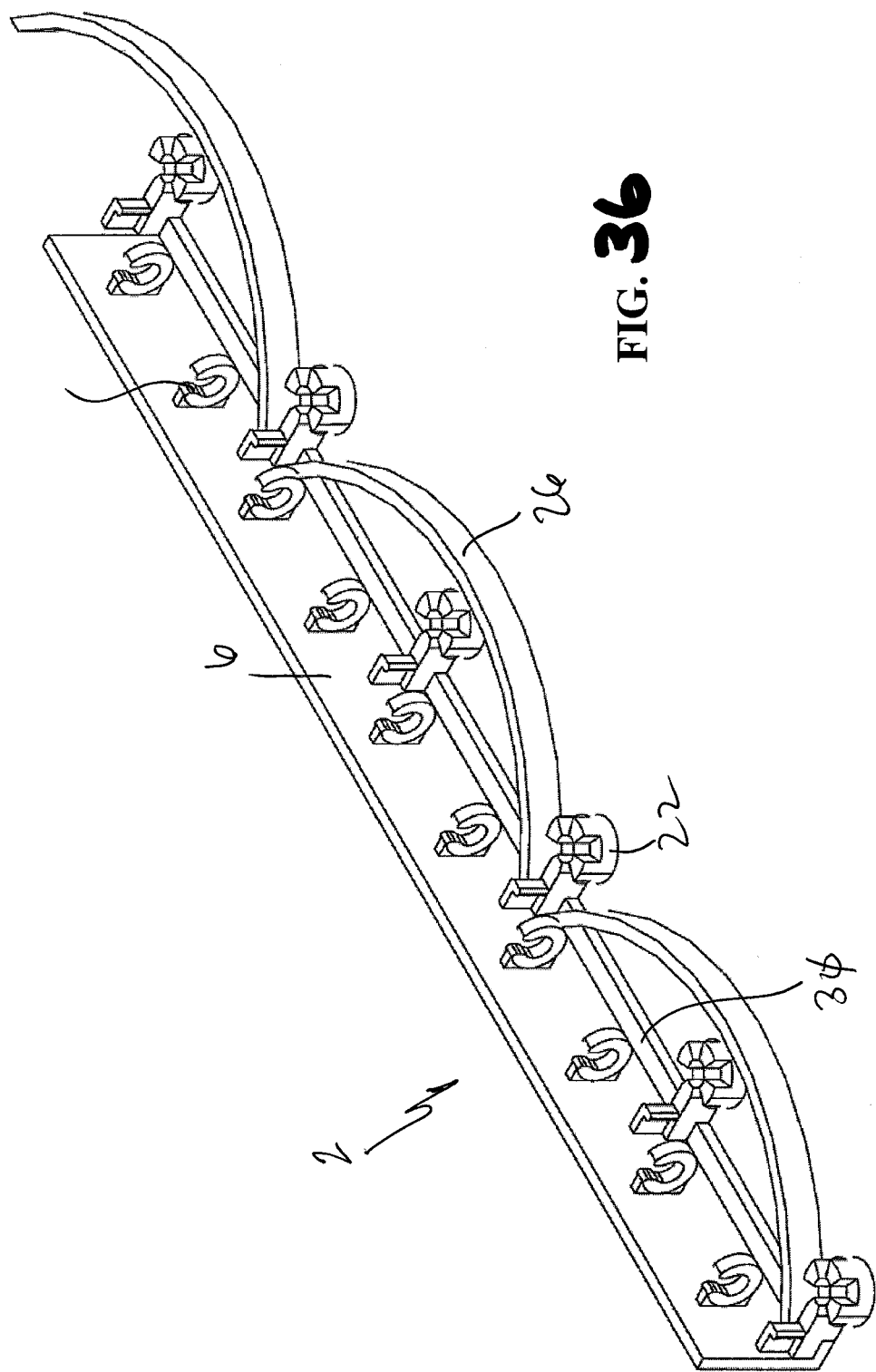
FIG. 36 is a detailed view of another embodiment of the present invention similar to the embodiment shown in FIG. 1.
Figure 37:
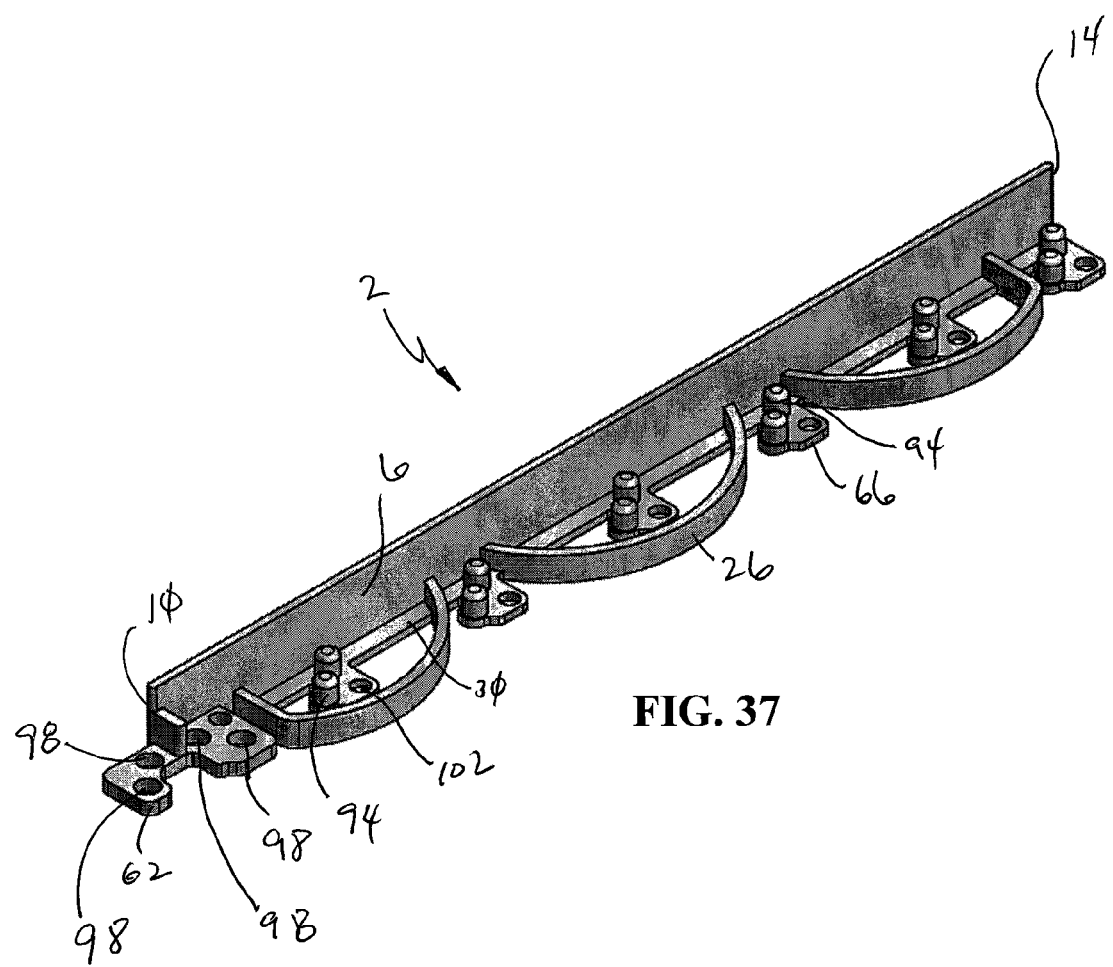
FIG. 37 is a perspective view of an embodiment of the present invention similar to that shown in FIGS. 17-25.
Figure 38:
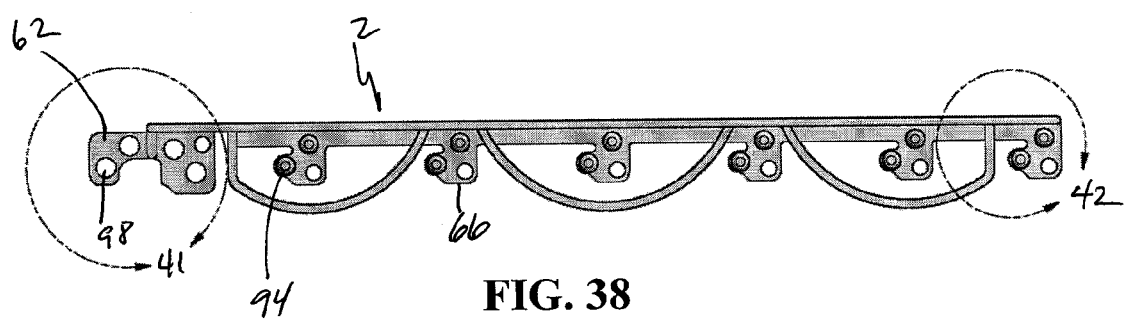
FIG. 38 is a top plan view of FIG. 37.
Figure 39:
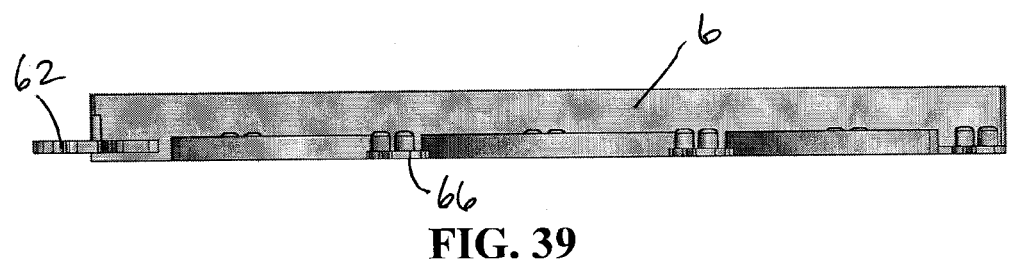
FIG. 39 is a front elevation view of FIG. 37.
Figure 40:
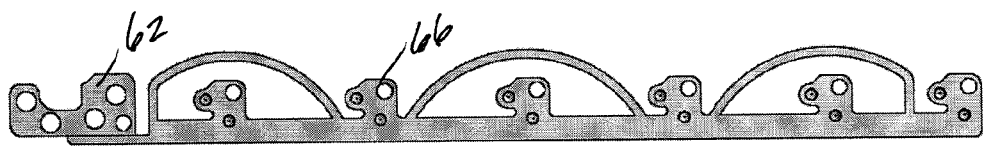
FIG. 40 is a bottom plan view of FIG. 37.
Figure 41:
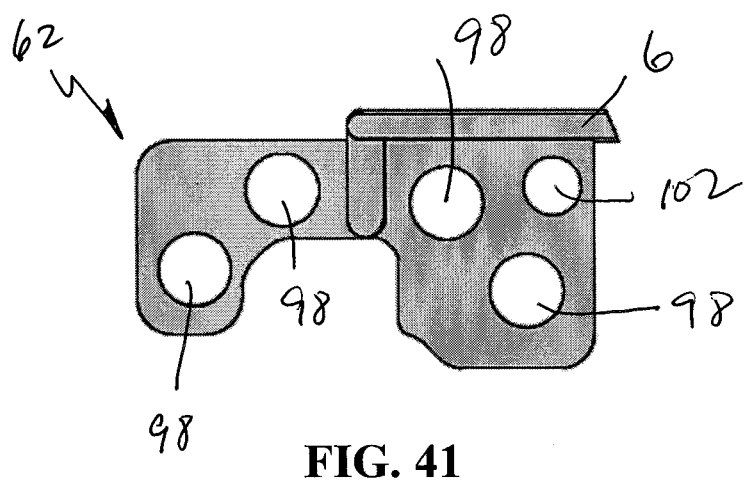
FIG. 41 is a detailed view of FIG. 38.
Figure 42:
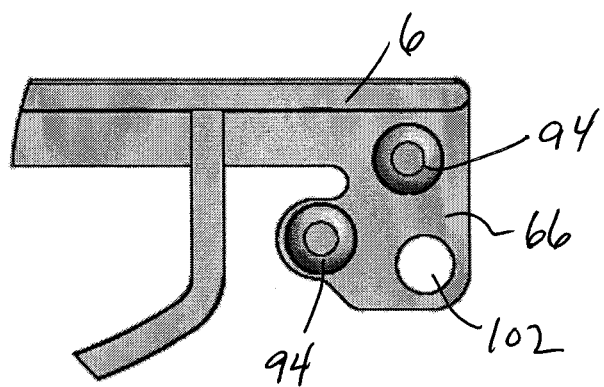
FIG. 42 is a detailed view of FIG. 38.
Figure 43:
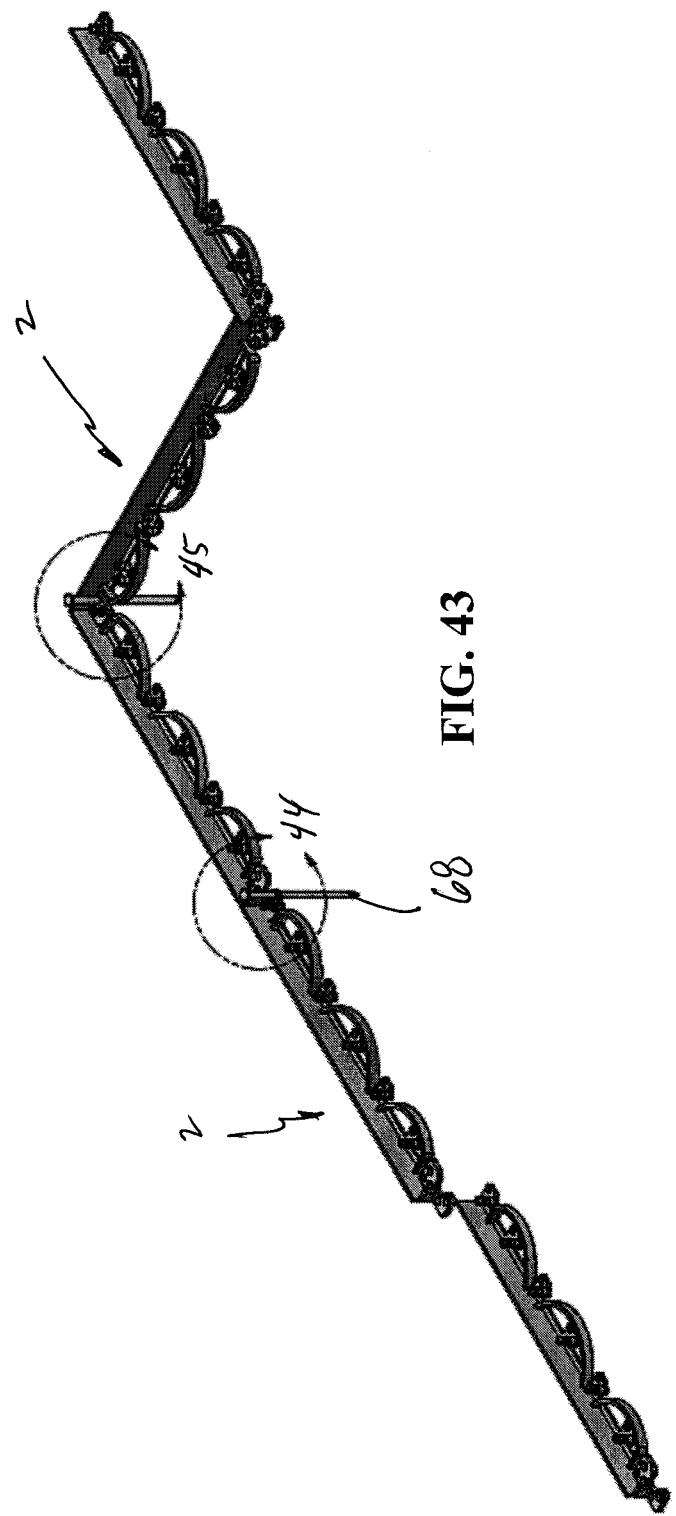
FIG. 43 is a perspective view of the embodiment of FIG. 37 shown interconnected to adjacent edgers.
Figure 44:
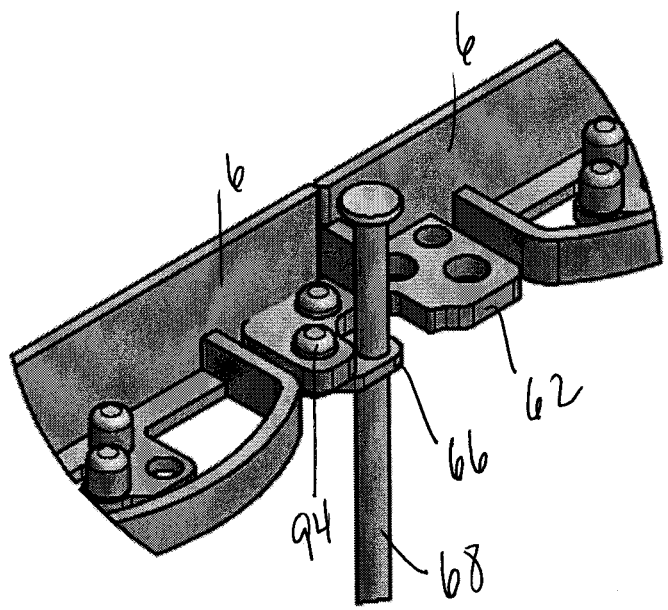
FIG. 44 is a detailed view of FIG. 43.
Figure 45:
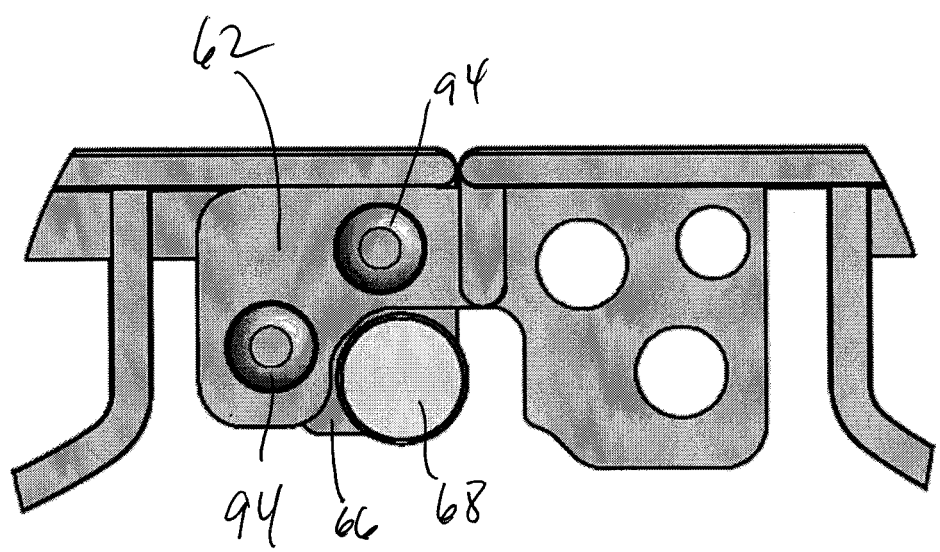
FIG. 45 is a top plan view of FIG. 44.

Referring now to FIG. 36, a perspective view of another embodiment of the present invention is shown. This embodiment of the present invention is similar to that shown in FIGS. 10-16 with the exception of the addition of a plurality of clips 90 aligned on the wall 6. The clips 90 are designed to receive a longitudinally oriented reinforcing member such as a spike that is interconnected to two or more clips proximate to the end of two adjacent edgers. Further, the spike may be used to provide rigidity within an interior portion of an edger. More specifically, when two adjacent edgers are aligned, a fastener or other reinforcing member is associated with the clips 90 of adjacent edgers to increase the bending stiffness of the wall.

Referring now to FIGS. 37-47, another embodiment similar to that shown in FIGS. 17-25 is shown. This embodiment of the present invention also includes a wall 6 that is associated with a footer 30 and also includes a plurality of arcuate members 26 positioned between a first end 10 of the edger and a second end 14 of the edger. Further, an upper tab 62 and a plurality of lower tabs 66 are also associated with the edger 2. Further, included are a plurality of posts 94 that are associated with the lower tabs 66. The posts 94 interface with a plurality of apertures 98 of the upper tab 62 to interconnect adjacent edgers.

Figure 46:
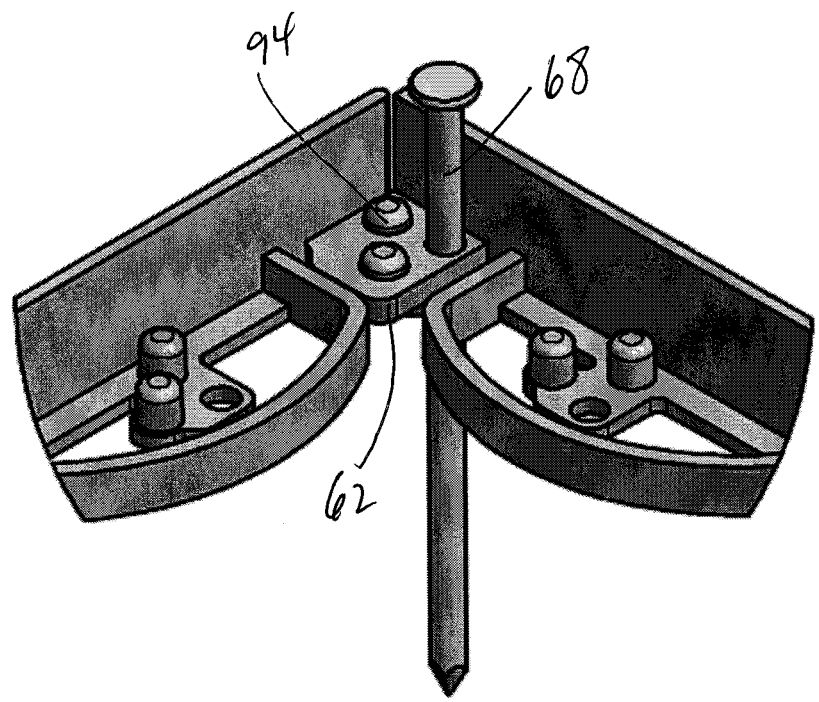
FIG. 46 is a detailed view of FIG. 43.
Figure 47:
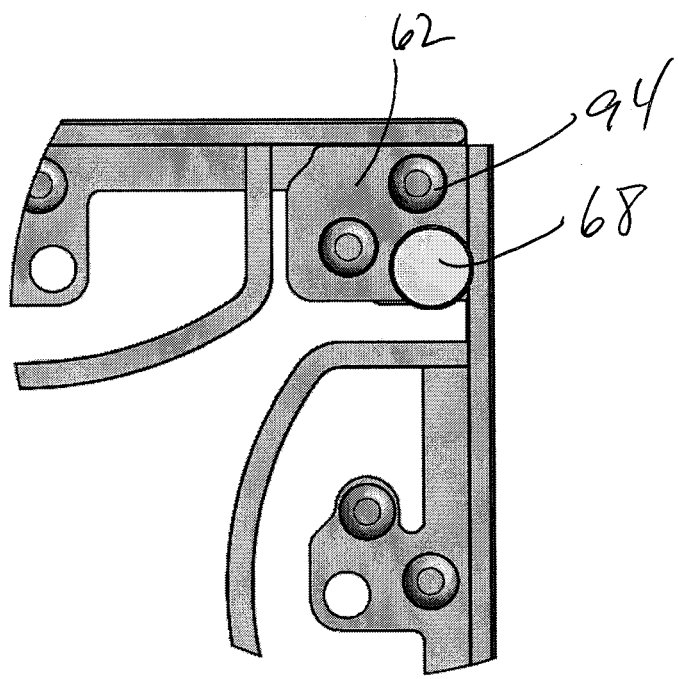
FIG. 47 is a top plan view of FIG. 46.

Referring now specifically to FIGS. 43-47, the interconnection of adjacent edgers 2 is shown. For example, to form a straight interconnection (FIGS. 44 & 45) of two adjacent edgers 2, the walls 6 thereof are aligned and the posts 94 are positioned within at least some of the apertures 98 of the upper tab 62. A spike aperture 102 of the lower tab 66 receives the spike 68. In order to form a corner, the walls 6 of adjacent edgers 2 are placed about 90° from each other wherein a spike aperture 102 of the upper tab 62 receives the spike 68 (FIGS. 46 and 47).

To install one embodiment of the present invention, initially, the location of the landscape surface (i.e., "hardscape") is identified and prepared by excavating an area at least about 6" up to about 12" wider that the contemplated outer edges of the surface. In addition, the hardscape is further modified with the objective to prepare a uniform compacted surface, preferably, with a slight slope (⅛" to ¼" per foot) away from existing structures to manage water drainage. The pavers are then installed, which is well known in the art. The edgers 2 are then installed around the pavers on top of the compacted hardscape. The spikes 68 are used to secure the edges to the ground at about 12" to about 24" intervals, depending on whether the edger is straight or curved. That is, when installing edgers along a straight section of pavers, spike spacing may be at about 20" or about 24" intervals. When installing adjacent to a curved paver configuration, spike spacing can be increased to about 12" or about 16" intervals.

Figure 47A:
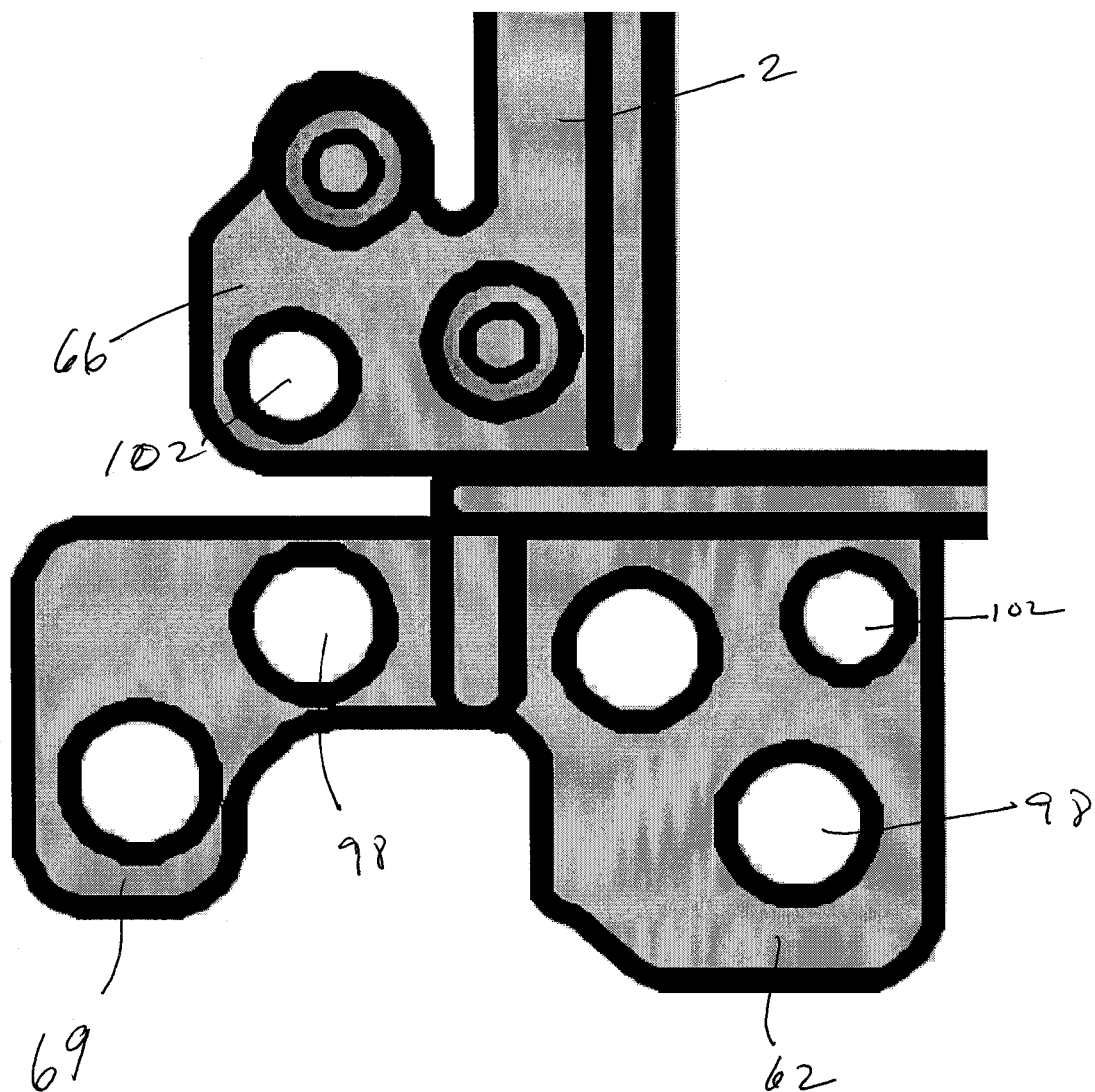
FIG. 47a is a top plan view of a portion of FIG. 43 that shows an exterior corner.
Figure 48:
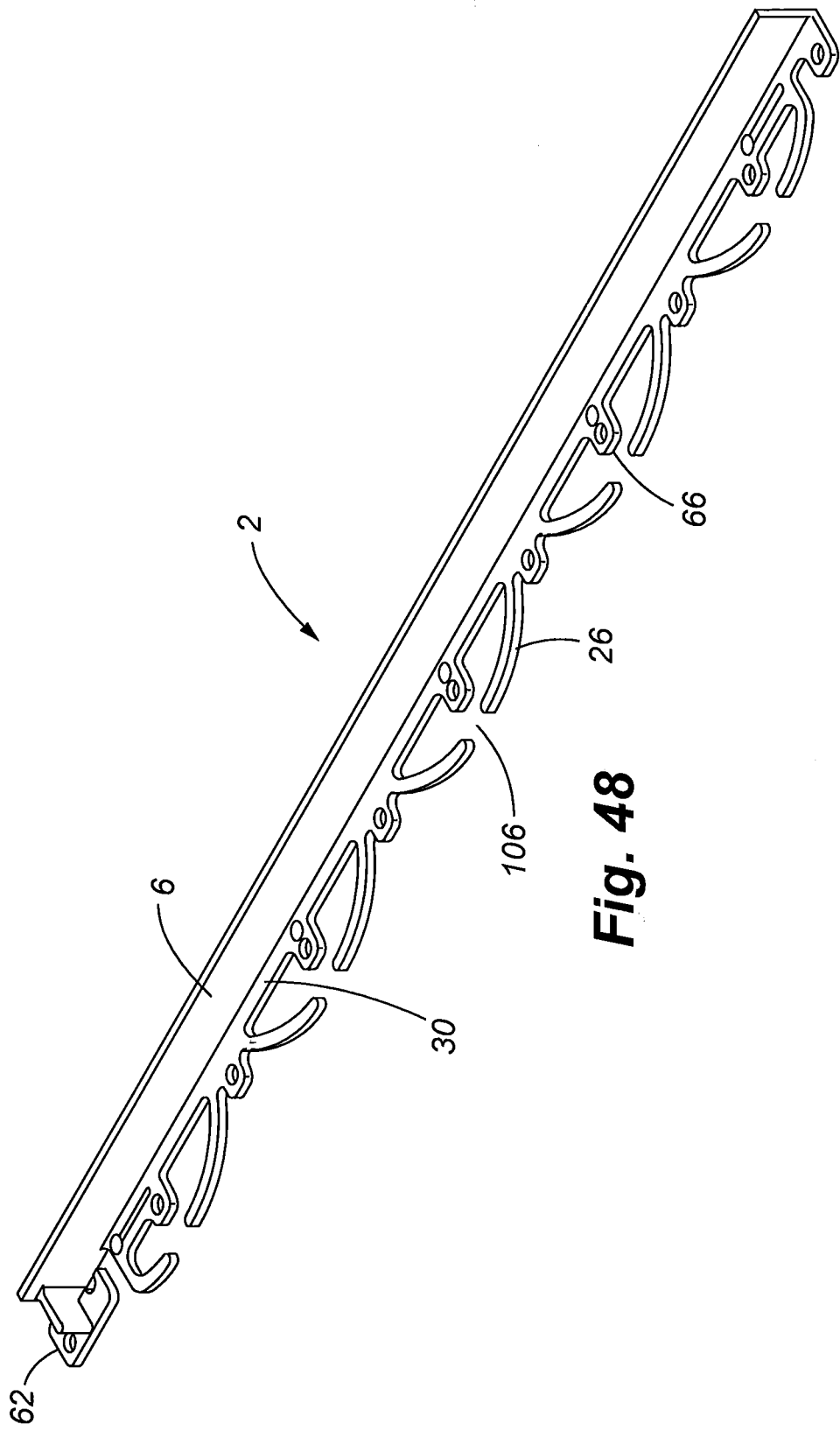
FIG. 48 is a perspective view of another embodiment of the present invention that employs split arcuate members.
Figure 49:
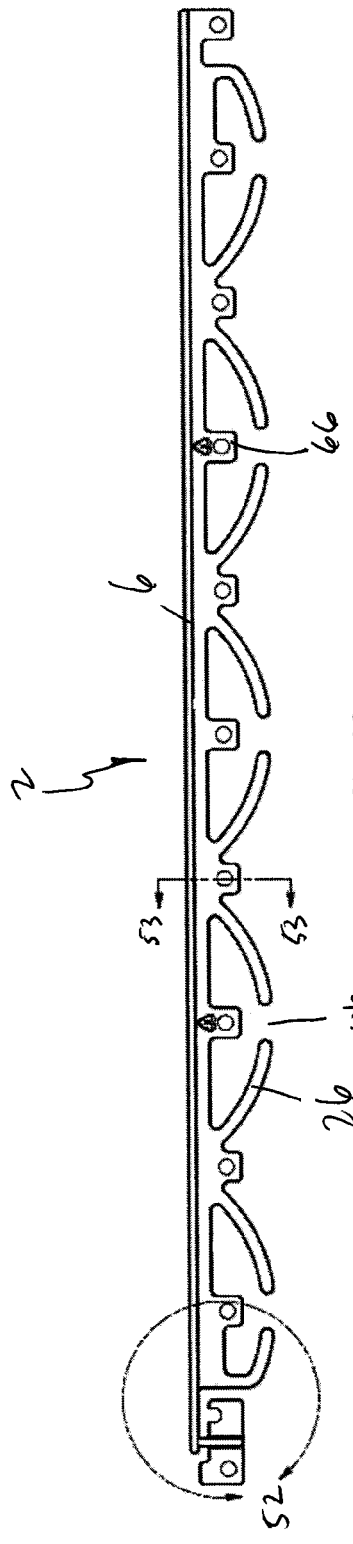
FIG. 49 is a top plan view of FIG. 48.
Figure 50:
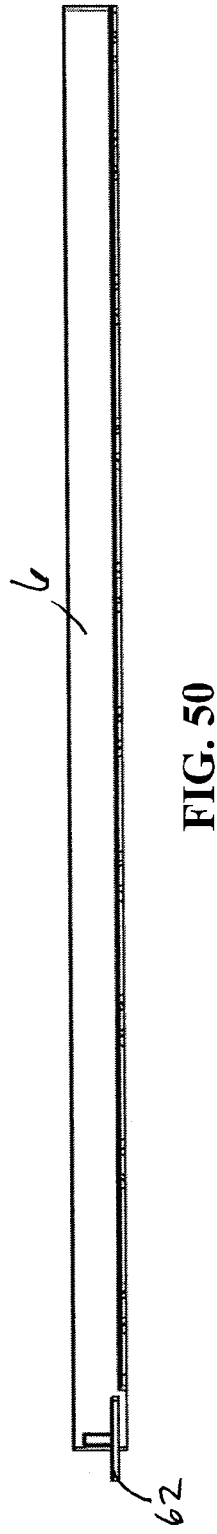
FIG. 50 is a front elevation view of FIG. 48.
Figure 51:
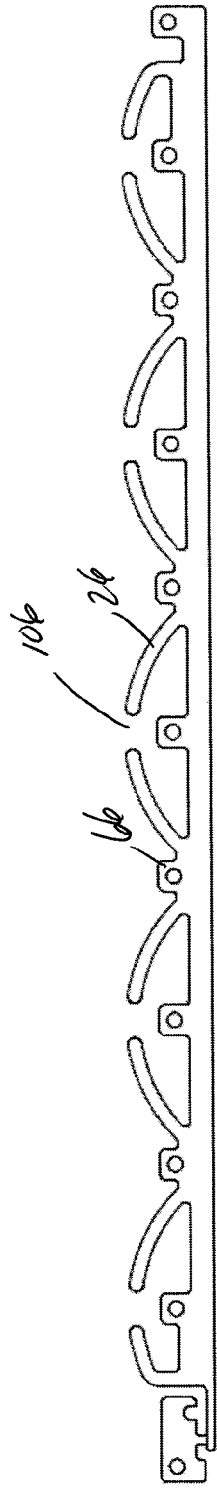
FIG. 51 is a bottom plan view of FIG. 48.
Figure 52:
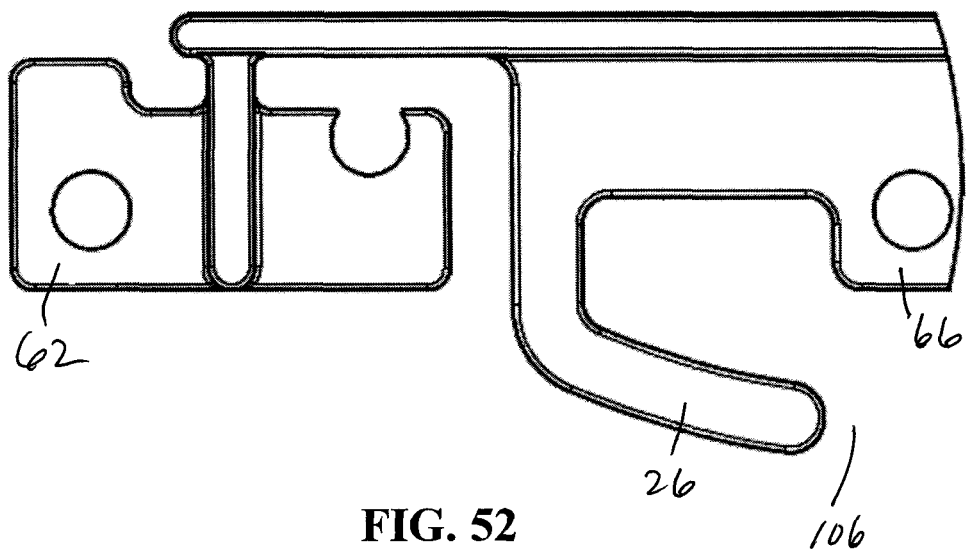
FIG. 52 is detailed view of FIG. 49.
Figure 53:
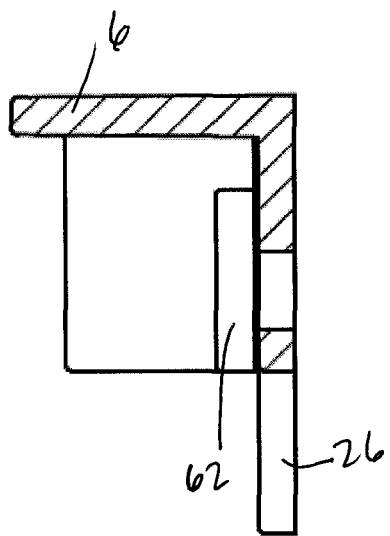
FIG. 53 is a cross sectional view of FIG. 49.
Figure 58:
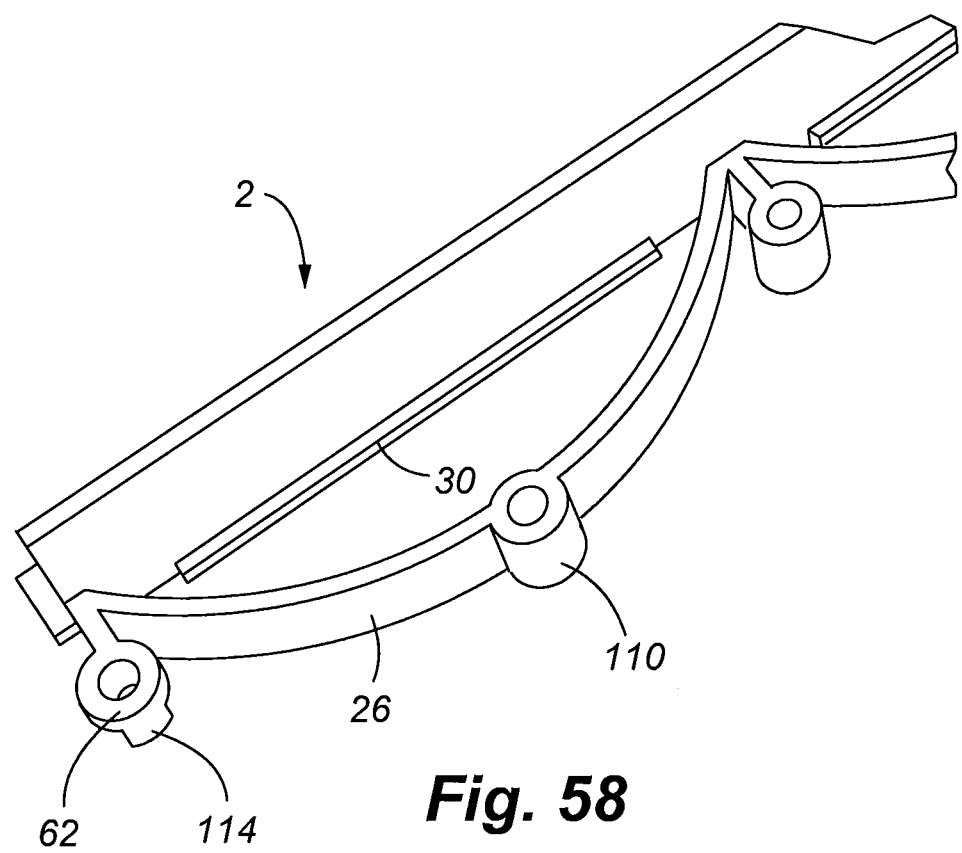
FIG. 58 is a partial perspective view of an alternative embodiment of the edger shown in FIG. 1.
Figure 59:
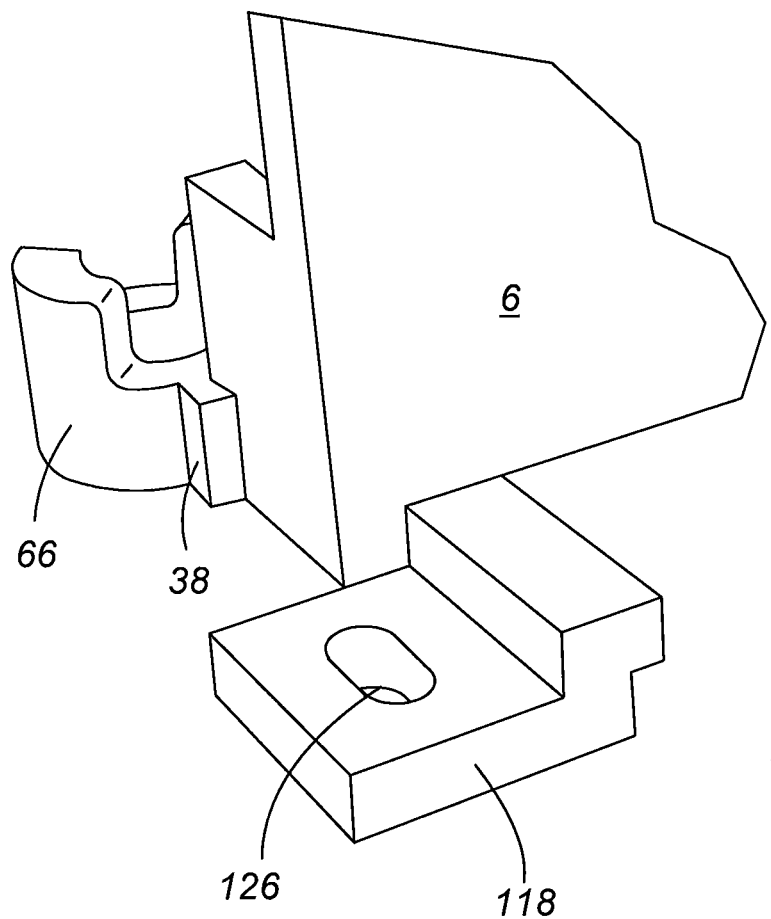
FIG. 59 is a rear perspective detailed view of FIG. 58.
Figure 60:
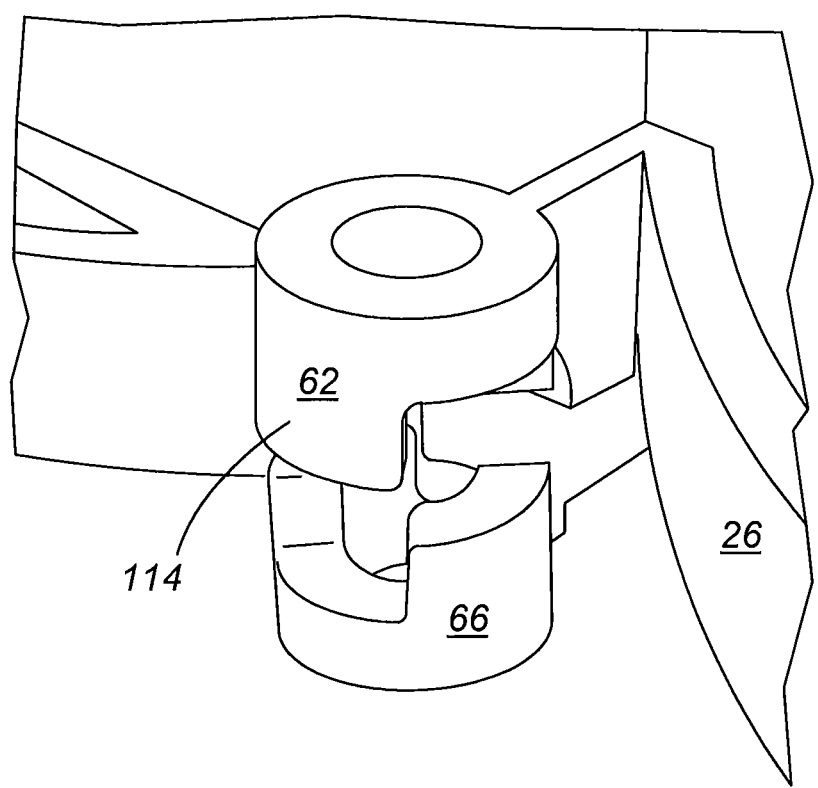
FIG. 60 is a partial perspective detailed view of the embodiment of FIG. 58 shown interconnected to an adjacent edger.
Figure 61:
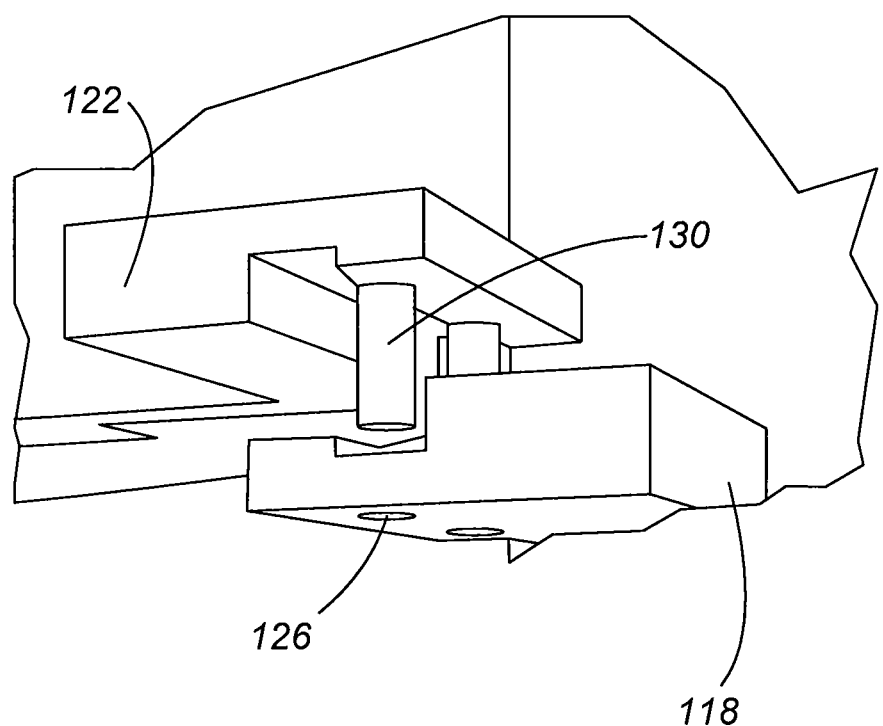
FIG. 61 is a rear perspective detailed view showing the interconnection of the edger of the embodiment of FIG. 58 shown interconnected to an adjacent edger.

Preferably, the edgers 2 are installed from right to left relative to the paver layout wherein installation begins by identifying a corner toward the right end of a straight section of the layout. After the first section is positioned firmly against the pavers, a spike is driven into the ground through the last spike aperture. When forming an outside corner, two spikes 68 are used (see, for example, FIG. 47*a*) and a single spike 68 is used to form and inside corner after a frangible portion 69 (see FIG. 47*a*) of the upper tab 62 is removed (see FIGS. 46 and 47). To form a uniform gradual curve spikes are installed more frequently.

Referring now to FIGS. 48-57, yet another embodiment of the present invention similar to that shown in FIGS. 17-25 that employs a plurality of arcuate members that are split and incorporate a gap 106. The arcuate members 26 thus the edger 2 possessed greater flexibility while effectively providing rigidity to the vertical wall 6. The interconnection of adjacent edgers shown in FIGS. 54-57 is similar to that described above with respect to various other embodiments of the present invention. One of skill in the art will appreciate that the adjacent edgers may be interconnected continuously to form an interior corner, or to form an exterior corner. Although the angles between adjacent walls 6 are shown in the drawings provided herein as being angled about 90°, as alluded to above, one skilled in the art will appreciate that any angle between adjacent edger walls may be provided.

Referring now to 58-61, yet another embodiment of the present invention is shown. In this embodiment, a spike receiving member 110 is integrated into the arcuate member 26. Furthermore, the upper attachment member 62 and the lower attachment member 66 each include a single tooth 114 to provide interlocking relationship between the two edgers. Furthermore, the footer 30 is not continuous and includes spaces to accommodate end points of the arcuate member and the projections 38 associated with the lower attachment member. The most notable difference is a lower bracket 118 and an upper bracket 122 associated with the wall 6. Preferably, the lower bracket 118 includes at least one aperture 126 for receiving pins 130 associated with the upper bracket 122 (the reverse interconnection scheme could be employed).

The various embodiments of the present invention described herein are made of a rigid or semi-rigid material that may be selectively cut. For example, heavy duty plastics, composite materials or other materials well known in the art may be utilized. The edger is designed to be cut at various locations to provide lengths to accommodate any edging configuration. One skilled in the art will appreciate that the edger is cut adjacent to the lower adjacent members, whereby the lower adjacent member situated near the cut would interconnect with the upper attachment member.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. An edger for retaining landscaping materials in a predetermined configuration, comprising:
    an elongated, vertically oriented plate having a first end and a second end, said elongated plate comprising an outer surface adapted for contacting the landscaping materials and an inner surface on an opposing side;
    a footer interconnected to said inner surface of said elongated wall proximate to a lower edge;
    a plurality of elongated arcuate shaped reinforcing members, each of said reinforcing members having a first end and a second end and a predetermined length, said reinforcing members spaced apart at predetermined intervals along said elongated, vertically orientated plate, said reinforcing members interconnected to at least one of said inner surface and said footer at said first end and said second end of the arcuate shaped reinforcing member, and wherein said predetermined length extends arcuately in a substantially horizontal plane away from the inner surface of the elongated plate wherein a first end of a first elongated arcuate shaped reinforcing member is disposed substantially proximate a second end of a second elongated arcuate shaped reinforcing member plate;
    wherein a first end of a first elongated arcuate shaped reinforcing member is disposed substantially proximate a second end of a second elongated arcuate shaped reinforcing member;
    a first connector member interconnected to at least one of said first end of said elongated plate and said footer, and a second connector member interconnected to at least one of said second end of said elongated plate and said footer, said first connector and said second connector configured for operable interconnection to allow two or more elongated edgers to be aligned in a longitudinal direction or at right angles.

2. The edger of claim 1, further comprising a spike adapted to penetrate an aperture positioned in at least one of said first connector and said second connector.

3. The edger of claim 1, wherein said first connector member comprises a plate with at least one aperture, and said second connector member comprises a plate with at least one aperture adapted for alignment with said at least one aperture of first connector member to receive a spike.

4. The edger of claim 1, further comprising a plurality of second connectors positioned between said first end and said second end of said elongated plate, wherein the edger may be cut to a predetermined length.

5. The edger of claim 1, wherein said edger can be bent to a five foot radius of curvature in a ten foot section.

6. The edger of claim 1 wherein said plurality of arcuate shaped reinforcing members have an interior portion removed.

7. The edger of claim 1 further comprising an intermediate connector member disposed between a first end and a second end of at least one of said plurality of elongated arcuate shaped reinforcing members.

8. The edger of claim 7, wherein the edger can be cut at a predetermined length and one of said intermediate connections can be interconnected to one of said first connector and said second connector.

9. An edger for retaining landscaping materials in a predetermined configuration, comprising:
    a vertically oriented plate comprising an outer surface adapted for contacting the landscaping materials and an inner surface on an opposing side;
    a footer interconnected to at least one of said inner surface and said outer surface of said plate;

a plurality of elongated arcuate shaped reinforcing members having a first end and a second end and a predetermined length, said arcuate shaped reinforcing members spaced apart at predetermined intervals between a first end and a second end of said vertically oriented plate, said reinforcing members interconnected to at least one of said inner surface and said footer at said first end and said second end of the reinforcing member, and wherein said predetermined length extends arcuately in a substantially horizontal plane away from the inner surface of the plate;

wherein a first end of a first elongated arcuate shaped reinforcing member is disposed substantially proximate a second end of a second elongated arcuate shaped reinforcing member;

a first connector member interconnected to at least one of said first end of said plate and said footer, and a second connector member interconnected to at least one of said second end of said plate and said footer, said first connector and said second connector configured for operable interconnection to allow two or more elongated edgers to be aligned in a longitudinal direction; and an intermediate connector member disposed between a first end and a second end of at least one of said plurality of elongated arcuate shaped reinforcing members.

* * * * *